US010536328B2

United States Patent
Atanasov

(10) Patent No.: US 10,536,328 B2
(45) Date of Patent: Jan. 14, 2020

(54) METHODS AND SYSTEMS THAT IMPLEMENT AN APPLICATION-LEVEL TUNNEL THROUGH WHICH LONG SYSLOG MESSAGES ARE TRANSMITTED

(71) Applicant: VMware, Inc., Palo Alto, CA (US)

(72) Inventor: Rusko Atanasov, Sofia (BG)

(73) Assignee: VMware, Inc., Palo Alto, CA (US)

( * ) Notice: Subject to any disclaimer, the term of this patent is extended or adjusted under 35 U.S.C. 154(b) by 301 days.

(21) Appl. No.: 15/612,809

(22) Filed: Jun. 2, 2017

(65) Prior Publication Data

US 2018/0351780 A1   Dec. 6, 2018

(51) Int. Cl.
*H04L 12/24* (2006.01)
*H04L 29/08* (2006.01)

(52) U.S. Cl.
CPC ............ *H04L 41/069* (2013.01); *H04L 67/10* (2013.01); *H04L 69/329* (2013.01)

(58) Field of Classification Search
CPC ...... H04L 41/069; H04L 69/329; H04L 67/10
See application file for complete search history.

(56) References Cited

U.S. PATENT DOCUMENTS

| 6,597,918 | B1* | 7/2003 | Kim | H04L 51/066 370/236 |
| 6,799,220 | B1* | 9/2004 | Merritt | H04L 12/4633 709/205 |
| 8,856,257 | B1* | 10/2014 | Zhang | G06F 11/3006 709/207 |
| 2006/0018315 | A1* | 1/2006 | Baratakke | H04L 69/16 370/389 |
| 2015/0094107 | A1* | 4/2015 | Chen | H04W 4/14 455/466 |
| 2015/0181004 | A1* | 6/2015 | Miao | H04L 43/06 709/202 |

* cited by examiner

*Primary Examiner* — Nicholas R Taylor
*Assistant Examiner* — Sanjoy K Roy

(57) ABSTRACT

The current document is directed to methods and systems that implement an application-level tunnel through which syslog messages are transmitted. In one implementation, the message portion of syslog messages transmitted through the application-level tunnel includes both a unique message identifier and a long-message-indication field. Syslog messages that contain message portions of greater lengths than a specified maximum length, referred to as "long syslog messages," are transmitted through the application-level tunnel as multiple component syslog messages, each with a message portion that includes, in addition to a unique message identifier and a long-message-indication field with a positive value, a long-message field that contains a sequence number for the long-message portion and the total number of long-message portions.

20 Claims, 26 Drawing Sheets

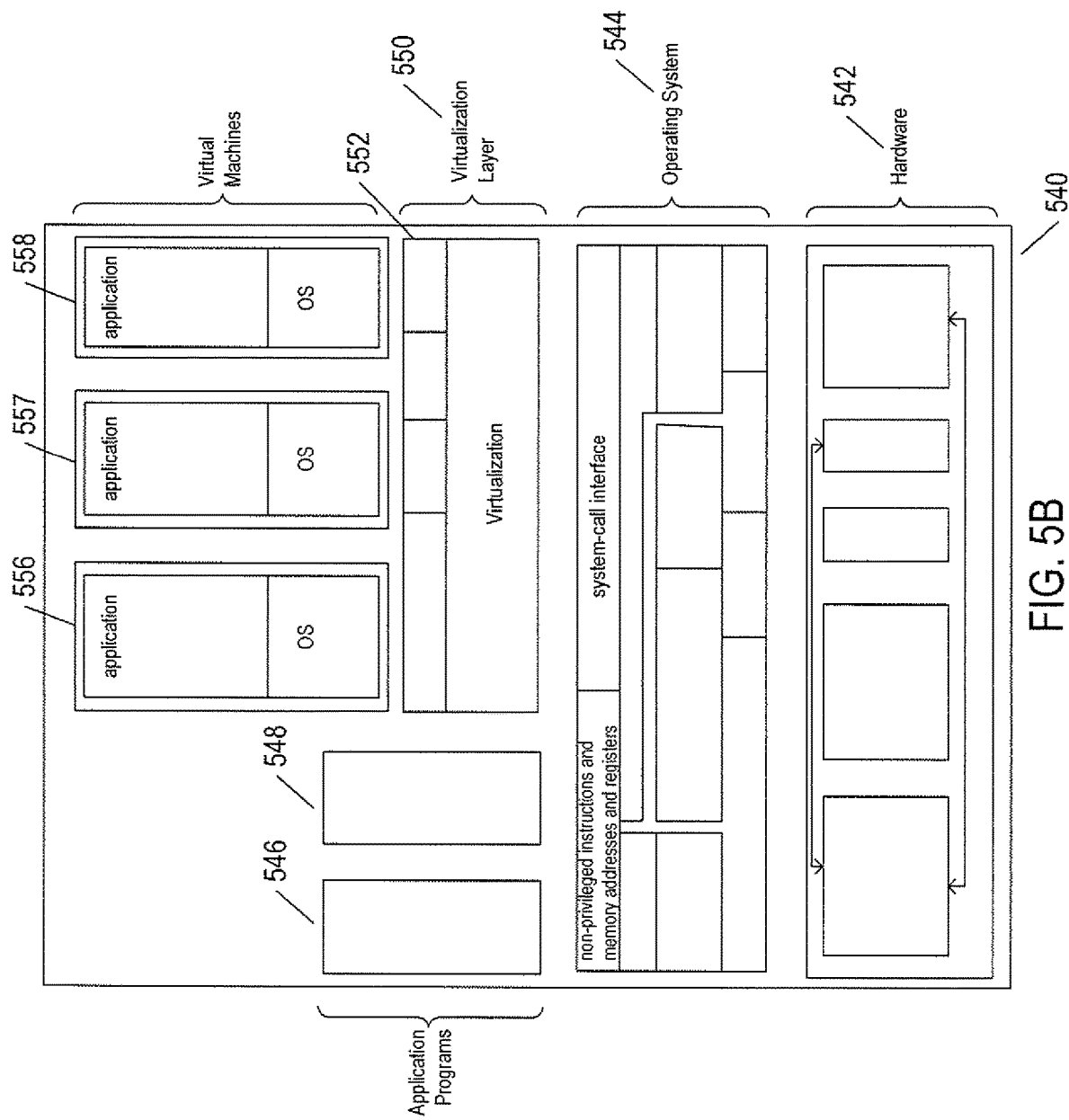

```
                   1208    1210
          1202
                ⋮
   ┌─────────────────────────────────────────────────────────┐
   │ 2013-12-02T10:44:24.095Z li-qe-esx5.vmware.com Rhttpproxy:│
   │ [28959B90 verbose 'Proxy Req 46691'] Connected to        │
   │ localhost:8307 ──── 1212              ─ 1206             │
   ├─────────────────────────────────────────────────────────┤
   │ 2013-12-02T10:44:24.094Z li-qe-esx5.vmware.com Rhttpproxy:│
   │ [FFFC2B90 verbose 'Proxy Req 46691'] new proxy client    │
   │ TCP (local=127.0.0.1:80, peer=127.0.0.1:50155)           │
   ├─────────────────────────────────────────────────────────┤
   │ 2013-12-02T10:44:24.093Z li-qe-esx5.vmware.com Rhttpproxy:│
   │ [2889B90 verbose 'Proxy Req 46685'] The client closed the│
   │ stream, not unexpectedly.                                │
   ├─────────────────────────────────────────────────────────┤
   │ Dec  2 18:48:29 strata-vc 2013-12-02T18:48:30.273Z       │
   │ [7FA39448B700 info 'commonvpxLro' opID=1947d6f9] [VpxLRO]│
   │ FINISH task-internal-2163522 -- -- vim.SessionManager.logout│
   ├─────────────────────────────────────────────────────────┤
   │ 2013-12-02T18:48:51.396Z strata-esxl.eng.vmware.com Vpxa:│
   │ [65B5AB90 verbose 'VpxaHalCnxHostagent' opID=WFU-ed393333]│
   │ [WaitForUpdatesDone] Completed callback                  │
   ├─────────────────────────────────────────────────────────┤
   │ 2013-12-02T18:48:51.395Z strata-esxl.eng.vmware.com Vpxa:│
   │ [65B5AB90 verbose 'VpxaHalCnxHostagent' opID=WFU-ed393333]│
   │ [WaitForUpdatesDone] Starting next WaitForUpdates() call to│
   │ hostd                                                    │
   ├─────────────────────────────────────────────────────────┤  1204
   │ 2013-12-02T18:48:51.395Z strata-esxl.eng.vmware.com Vpxa:│
   │ [65B5AB90 verbose 'vpxavpxaInvtVm' opID=WFU-ed393333]    │
   │ [VpxaInvtVmChangeListener] Guest DiskInfo Changed        │
   ├─────────────────────────────────────────────────────────┤
   │ 2013-12-02T18:48:51.395Z strata-esxl.eng.vmware.com Vpxa:│
   │ [65B5AB90 verbose 'halservices' opID=WFU-ed393333]       │
   │ [VpxaHalServices] VMGuestDiskChange Event for vm(6) 59   │
   ├─────────────────────────────────────────────────────────┤
   │ 2013-12-02T18:48:51.395Z strata-esxl.eng.vmware.com Vpxa:│
   │ [65B5AB90 verbose 'hostdvm' opID=WFU-ed393333]           │
   │ [VpxaHalVmHostagent] 59: GuestInfo changed 'guest.disk'  │
   ├─────────────────────────────────────────────────────────┤
   │ 2013-12-02T18:48:51.395Z strata-esxl.eng.vmware.com Vpxa:│
   │ [65B5AB90 verbose 'VpxaHalCnxHostagent' opID=WFU-ed393333]│
   │ [VpxaHalCnxHostagent::ProcessUpdate] Applying updates from│
   │ 123718 to 123719 (at 123718)                             │
   ├─────────────────────────────────────────────────────────┤
   │ 2013-12-02T18:48:51.395Z strata-esxl.eng.vmware.com Vpxa:│
   │ [65B5AB90 verbose 'VpxaHalCnxHostagent' opID=WFU-ed393333]│
   │ [WaitForUpdatesDone] Received callback                   │
   │ 2013-12-02T18:48:51.360Z li-dev-esx6.eng.vmware.com Hostd:│
   │ [617C1B90 error 'SoapAdapter.HTTPService'] HTTP Transaction│
   └─────────────────────────────────────────────────────────┘
                ⋮

FIG. 12
```

METHODS AND SYSTEMS THAT IMPLEMENT AN APPLICATION-LEVEL TUNNEL THROUGH WHICH LONG SYSLOG MESSAGES ARE TRANSMITTED

TECHNICAL FIELD

The current document is directed to the generation and distribution of event messages, and, in particular, to methods and systems that provide an application-level tunnel through which long syslog messages are transmitted.

BACKGROUND

During the past seven decades, electronic computing has evolved from primitive, vacuum-tube-based computer systems, initially developed during the 1940s, to modern electronic computing systems in which large numbers of multi-processor servers, work stations, and other individual computing systems are networked together with large-capacity data-storage devices and other electronic devices to produce geographically distributed computing systems with hundreds of thousands, millions, or more components that provide enormous computational bandwidths and data-storage capacities. These large, distributed computing systems are made possible by advances in computer networking, distributed operating systems and applications, data-storage appliances, computer hardware, and software technologies. Despite all of these advances, however, the rapid increase in the size and complexity of computing systems has been accompanied by numerous scaling issues and technical challenges, including technical challenges associated with communications overheads encountered in parallelizing computational tasks among multiple processors, component failures, and distributed-system management. As new distributed-computing technologies are developed and as general hardware and software technologies continue to advance, the current trend towards ever-larger and more complex distributed computing systems appears likely to continue well into the future.

In modern computing systems, individual computers, subsystems, and components generally output large volumes of status, informational, and error messages that are collectively referred to, in the current document, as "event messages." In large, distributed computing systems, terabytes of event messages may be generated each day. The event messages are often collected into event logs stored as files in data-storage appliances and are often analyzed both in real time, as they are generated and received, as well as retrospectively, after the event messages have been initially processed and stored in event logs. Event messages may contain information that can be used to detect serious failures and operational deficiencies prior to the accumulation of a sufficient number of failures and system-degrading events that lead to data loss and significant down time. The information contained in event messages may also be used to detect and ameliorate various types of security breaches and issues, to intelligently manage and maintain distributed computing systems, and to diagnose many different classes of operational problems, hardware-design deficiencies, and software-design deficiencies.

In many distributed systems, event messages are transmitted as syslog messages, from components and subsystems to a syslog server, from which an event-message logging, processing, and analysis subsystem retrieves the messages for analysis, archiving, and generation of alerts. The syslog standard specifies that syslog servers should support up syslog messages up to a specified size, such as 2048 bytes, but particular implementations are allowed to support syslog messages of greater size. Because, in large distributed computer systems, various different component systems and devices may be supplied by vendors different from the vendors who supply administration-and-management subsystems, problems may arise when component systems and devices assume maximum syslog message sizes greater than those handled by the syslog-server functionality within the supply the administration-and-management subsystems. Current solutions to these problems are associated with additional problems and deficiencies.

SUMMARY

The current document is directed to methods and systems that implement an application-level tunnel through which syslog messages are transmitted. In one implementation, the message portion of syslog messages transmitted through the application-level tunnel includes both a unique message identifier and a long-message-indication field. Syslog messages that contain message portions of greater lengths than a specified maximum length, referred to as "long syslog messages," are transmitted through the application-level tunnel as multiple component syslog messages, each with a message portion that includes, in addition to a unique message identifier and a long-message-indication field with a positive value, a long-message field that contains a sequence number for the long-message portion and the total number of long-message portions.

BRIEF DESCRIPTION OF THE DRAWINGS

FIGS. 5A-B illustrate two types of virtual machine and virtual-machine execution environments.

FIG. 12 shows a small, 11-entry portion of a log file from a distributed computer system.

DETAILED DESCRIPTION

Figure 1:
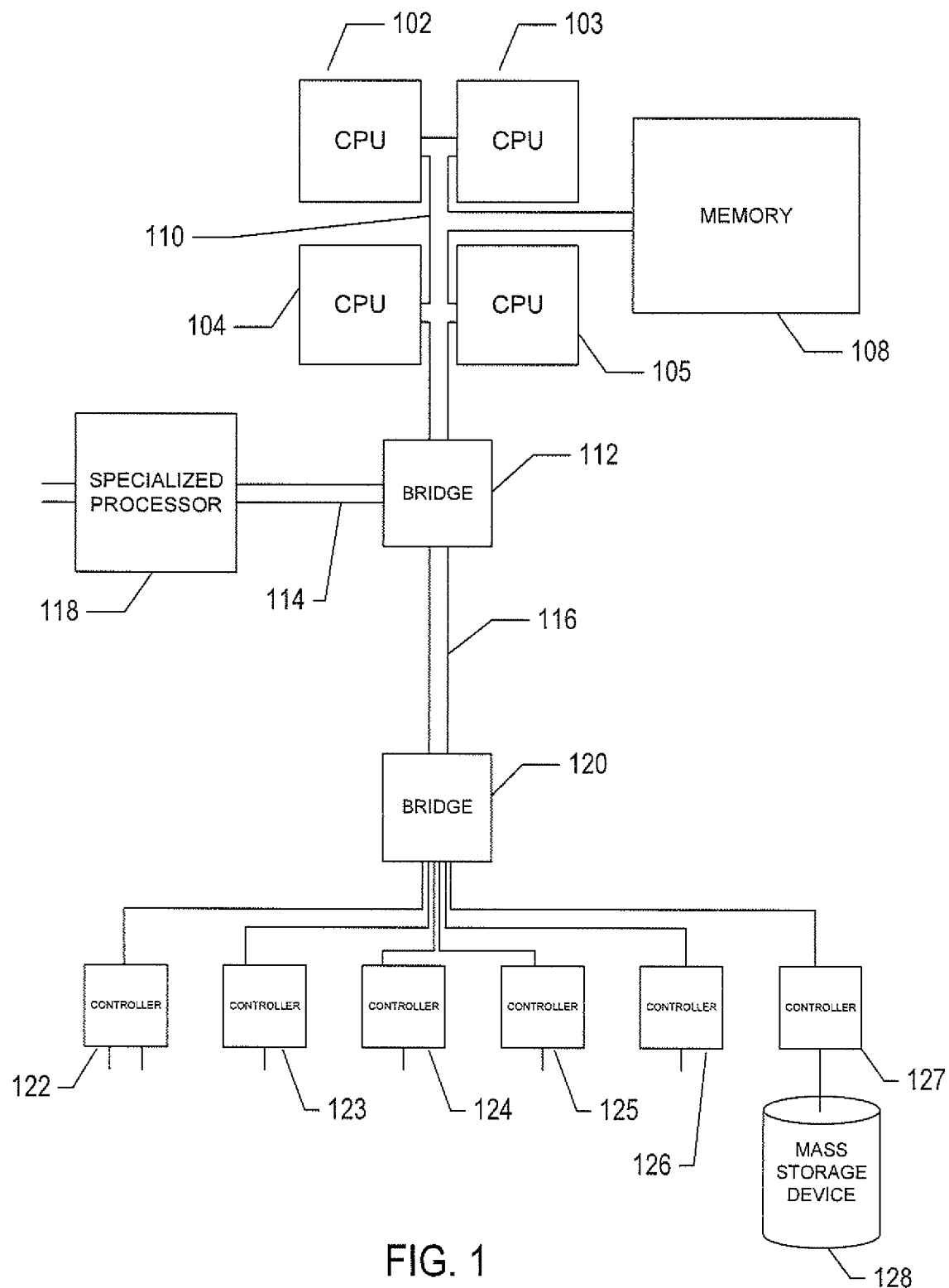
FIG. 1 provides a general architectural diagram for various types of computers.

The current document is directed to methods and systems that implement an application-level tunnel through which long syslog messages are transmitted. In a first subsection, below, a detailed description of computer hardware, complex computational systems, and virtualization is provided with reference to FIGS. 1-10. In a second subsection, event-message generation is discussed with reference to FIGS. 11-12. A final subsection discusses the currently disclosed methods and systems that implement the application-level tunnel.

Computer Hardware, Complex Computational Systems, and Virtualization

The term "abstraction" is not, in any way, intended to mean or suggest an abstract idea or concept. Computational abstractions are tangible, physical interfaces that are implemented, ultimately, using physical computer hardware, data-storage devices, and communications systems. Instead, the term "abstraction" refers, in the current discussion, to a logical level of functionality encapsulated within one or more concrete, tangible, physically-implemented computer systems with defined interfaces through which electronically-encoded data is exchanged, process execution launched, and electronic services are provided. Interfaces may include graphical and textual data displayed on physical display devices as well as computer programs and routines that control physical computer processors to carry out various tasks and operations and that are invoked through electronically implemented application programming interfaces ("APIs") and other electronically implemented interfaces. There is a tendency among those unfamiliar with modern technology and science to misinterpret the terms "abstract" and "abstraction," when used to describe certain aspects of modern computing. For example, one frequently encounters assertions that, because a computational system is described in terms of abstractions, functional layers, and interfaces, the computational system is somehow different from a physical machine or device. Such allegations are unfounded. One only needs to disconnect a computer system or group of computer systems from their respective power supplies to appreciate the physical, machine nature of complex computer technologies. One also frequently encounters statements that characterize a computational technology as being "only software," and thus not a machine or device.

Software is essentially a sequence of encoded symbols, such as a printout of a computer program or digitally encoded computer instructions sequentially stored in a file on an optical disk or within an electromechanical mass-storage device. Software alone can do nothing. It is only when encoded computer instructions are loaded into an electronic memory within a computer system and executed on a physical processor that so-called "software implemented" functionality is provided. The digitally encoded computer instructions are an essential and physical control component of processor-controlled machines and devices, no less essential and physical than a cam-shaft control system in an internal-combustion engine. Multi-cloud aggregations, cloud-computing services, virtual-machine containers and virtual machines, communications interfaces, and many of the other topics discussed below are tangible, physical components of physical, electro-optical-mechanical computer systems.

FIG. 1 provides a general architectural diagram for various types of computers. Computers that receive, process, and store event messages may be described by the general architectural diagram shown in FIG. 1, for example. The computer system contains one or multiple central processing units ("CPUs") 102-105, one or more electronic memories 108 interconnected with the CPUs by a CPU/memory-subsystem bus 110 or multiple busses, a first bridge 112 that interconnects the CPU/memory-subsystem bus 110 with additional busses 114 and 116, or other types of high-speed interconnection media, including multiple, high-speed serial interconnects. These buses or serial interconnections, in turn, connect the CPUs and memory with specialized processors, such as a graphics processor 118, and with one or more additional bridges 120, which are interconnected with high-speed serial links or with multiple controllers 122-127, such as controller 127, that provide access to various different types of mass-storage devices 128, electronic displays, input devices, and other such components, subcomponents, and computational resources. It should be noted that computer-readable data-storage devices include optical and electromagnetic disks, electronic memories, and other physical data-storage devices. Those familiar with modern science and technology appreciate that electromagnetic radiation and propagating signals do not store data for subsequent retrieval, and can transiently "store" only a byte or less of information per mile, far less information than needed to encode even the simplest of routines.

Of course, there are many different types of computer-system architectures that differ from one another in the number of different memories, including different types of hierarchical cache memories, the number of processors and the connectivity of the processors with other system components, the number of internal communications busses and serial links, and in many other ways. However, computer systems generally execute stored programs by fetching instructions from memory and executing the instructions in one or more processors. Computer systems include general-purpose computer systems, such as personal computers ("PCs"), various types of servers and workstations, and higher-end mainframe computers, but may also include a plethora of various types of special-purpose computing devices, including data-storage systems, communications routers, network nodes, tablet computers, and mobile telephones.

Figure 2:
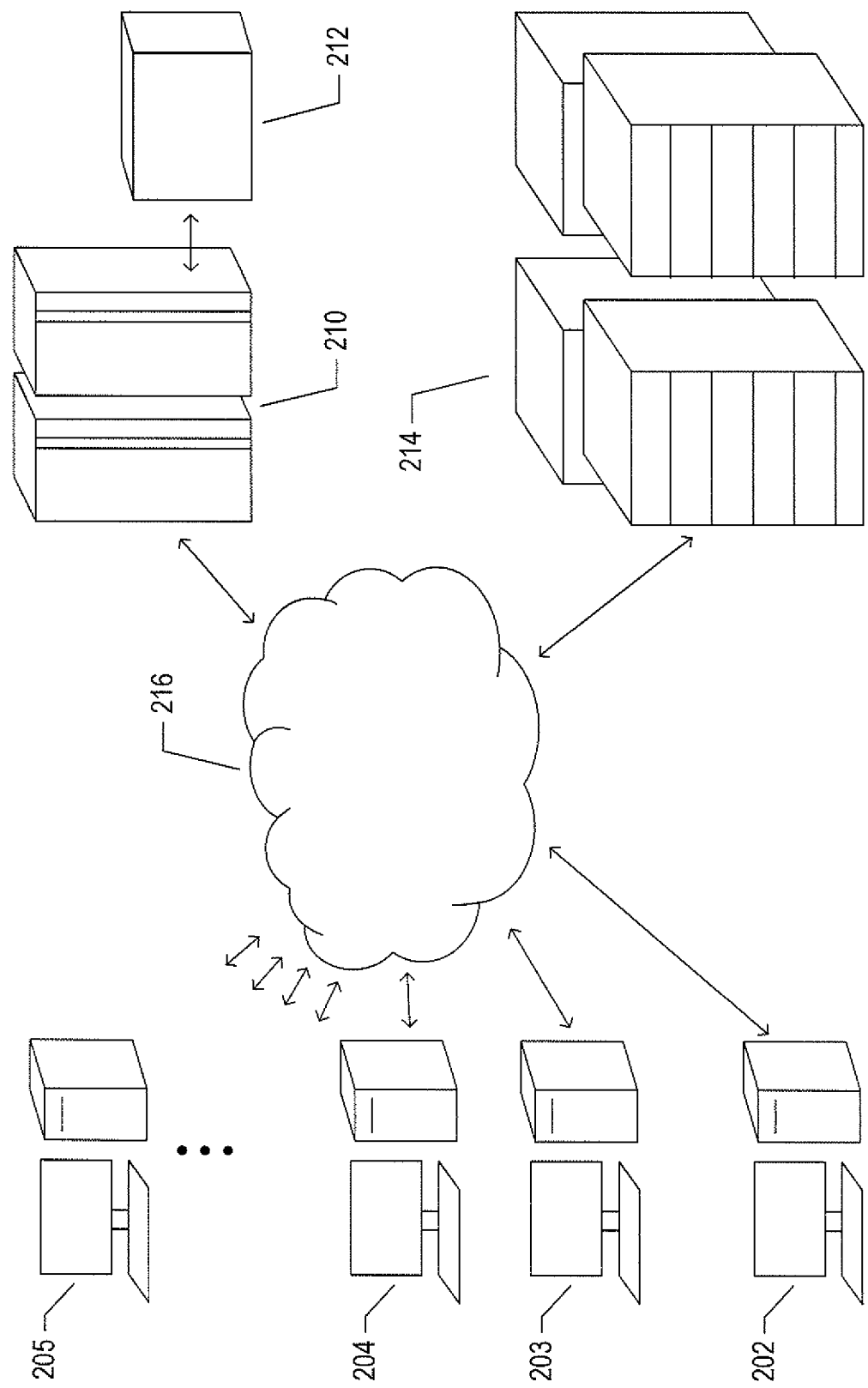
FIG. 2 illustrates an Internet-connected distributed computer system.

FIG. 2 illustrates an Internet-connected distributed computer system. As communications and networking technologies have evolved in capability and accessibility, and as the computational bandwidths, data-storage capacities, and other capabilities and capacities of various types of computer systems have steadily and rapidly increased, much of modern computing now generally involves large distributed systems and computers interconnected by local networks, wide-area networks, wireless communications, and the Internet. FIG. 2 shows a typical distributed system in which a large number of PCs 202-205, a high-end distributed mainframe system 210 with a large data-storage system 212, and a large computer center 214 with large numbers of rack-mounted servers or blade servers all interconnected through various communications and networking systems that together comprise the Internet 216. Such distributed computing systems provide diverse arrays of functionalities. For example, a PC user sitting in a home office may access hundreds of millions of different web sites provided by hundreds of thousands of different web servers throughout the world and may access high-computational-bandwidth computing services from remote computer facilities for running complex computational tasks.

Until recently, computational services were generally provided by computer systems and data centers purchased, configured, managed, and maintained by service-provider organizations. For example, an e-commerce retailer generally purchased, configured, managed, and maintained a data center including numerous web servers, back-end computer systems, and data-storage systems for serving web pages to remote customers, receiving orders through the web-page interface, processing the orders, tracking completed orders, and other myriad different tasks associated with an e-commerce enterprise.

Figure 3:
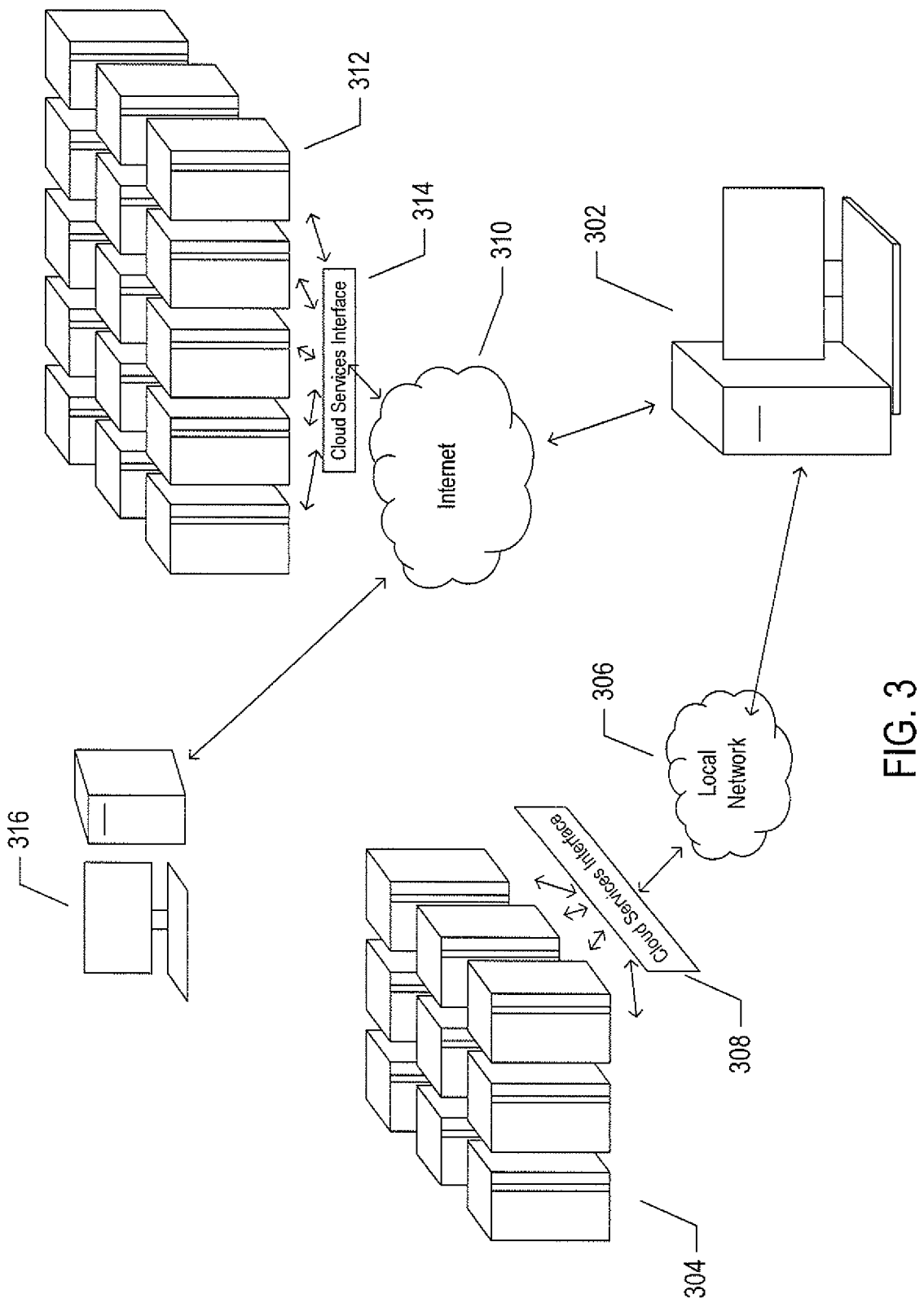
FIG. 3 illustrates cloud computing. In the recently developed cloud-computing paradigm, computing cycles and data-storage facilities are provided to organizations and individuals by cloud-computing providers.

FIG. 3 illustrates cloud computing. In the recently developed cloud-computing paradigm, computing cycles and data-storage facilities are provided to organizations and individuals by cloud-computing providers. In addition, larger organizations may elect to establish private cloud-computing facilities in addition to, or instead of, subscribing to computing services provided by public cloud-computing service providers. In FIG. 3, a system administrator for an organization, using a PC 302, accesses the organization's private cloud 304 through a local network 306 and private-cloud interface 308 and also accesses, through the Internet 310, a public cloud 312 through a public-cloud services interface 314. The administrator can, in either the case of the private cloud 304 or public cloud 312, configure virtual computer systems and even entire virtual data centers and launch execution of application programs on the virtual computer systems and virtual data centers in order to carry out any of many different types of computational tasks. As one example, a small organization may configure and run a virtual data center within a public cloud that executes web servers to provide an e-commerce interface through the public cloud to remote customers of the organization, such as a user viewing the organization's e-commerce web pages on a remote user system 316.

Cloud-computing facilities are intended to provide computational bandwidth and data-storage services much as utility companies provide electrical power and water to consumers. Cloud computing provides enormous advantages to small organizations without the resources to purchase, manage, and maintain in-house data centers. Such organizations can dynamically add and delete virtual computer systems from their virtual data centers within public clouds in order to track computational-bandwidth and data-storage needs, rather than purchasing sufficient computer systems within a physical data center to handle peak computational-bandwidth and data-storage demands. Moreover, small organizations can completely avoid the overhead of maintaining and managing physical computer systems, including hiring and periodically retraining information-technology specialists and continuously paying for operating-system and database-management-system upgrades. Furthermore, cloud-computing interfaces allow for easy and straightforward configuration of virtual computing facilities, flexibility in the types of applications and operating systems that can be configured, and other functionalities that are useful even for owners and administrators of private cloud-computing facilities used by a single organization.

Figure 4:
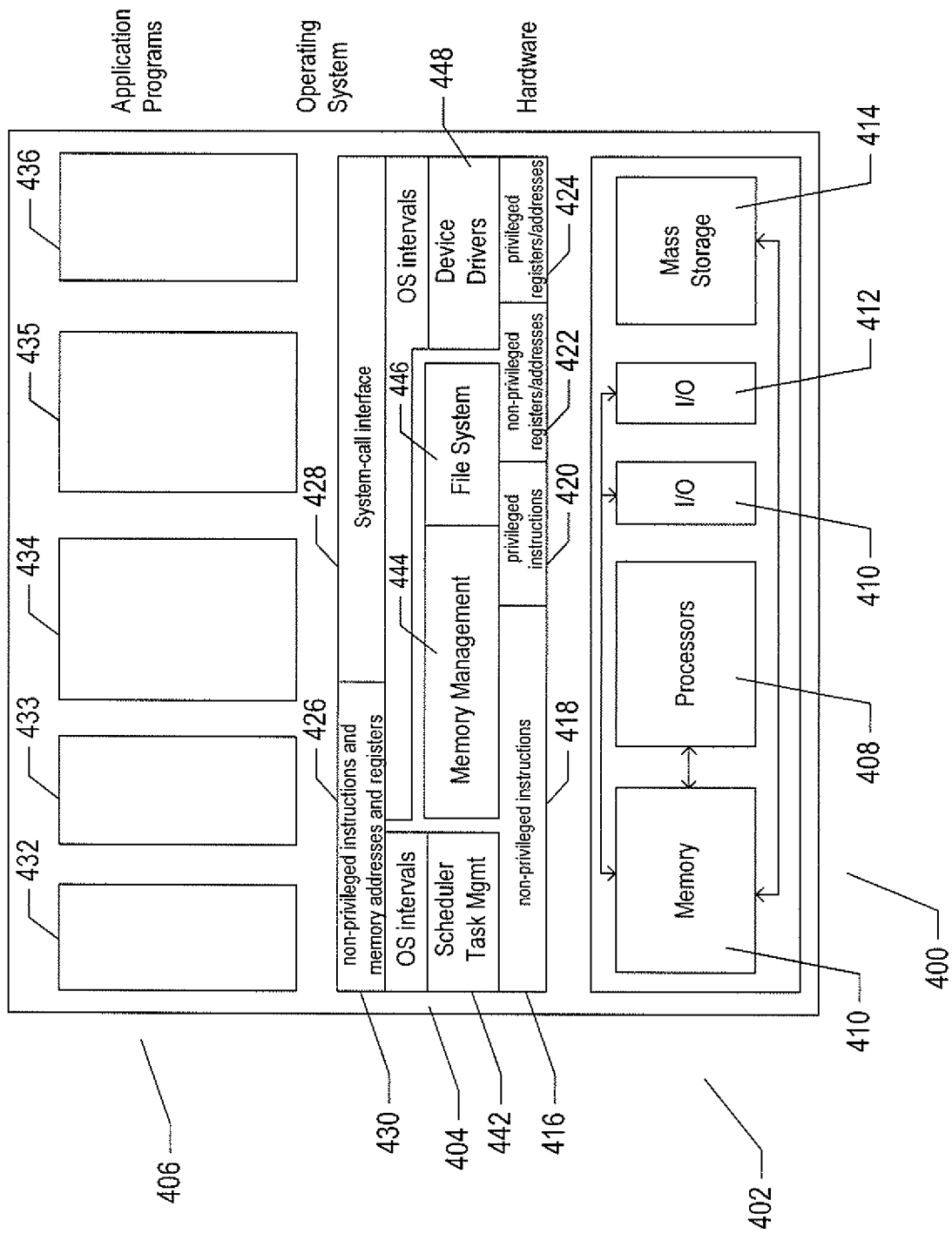
FIG. 4 illustrates generalized hardware and software components of a general-purpose computer system, such as a general-purpose computer system having an architecture similar to that shown in FIG. 1.

FIG. 4 illustrates generalized hardware and software components of a general-purpose computer system, such as a general-purpose computer system having an architecture similar to that shown in FIG. 1. The computer system 400 is often considered to include three fundamental layers: (1) a hardware layer or level 402; (2) an operating-system layer or level 404; and (3) an application-program layer or level 406. The hardware layer 402 includes one or more processors 408, system memory 410, various different types of input-output ("I/O") devices 410 and 412, and mass-storage devices 414. Of course, the hardware level also includes many other components, including power supplies, internal communications links and busses, specialized integrated circuits, many different types of processor-controlled or microprocessor-controlled peripheral devices and controllers, and many other components. The operating system 404 interfaces to the hardware level 402 through a low-level operating system and hardware interface 416 generally comprising a set of non-privileged computer instructions 418, a set of privileged computer instructions 420, a set of non-privileged registers and memory addresses 422, and a set of privileged registers and memory addresses 424. In general, the operating system exposes non-privileged instructions, non-privileged registers, and non-privileged memory addresses 426 and a system-call interface 428 as an operating-system interface 430 to application programs 432-436 that execute within an execution environment provided to the application programs by the operating system. The operating system, alone, accesses the privileged instructions, privileged registers, and privileged memory addresses. By reserving access to privileged instructions, privileged registers, and privileged memory addresses, the operating system can ensure that application programs and other higher-level computational entities cannot interfere with one another's execution and cannot change the overall state of the computer system in ways that could deleteriously impact system operation. The operating system includes many internal components and modules, including a scheduler 442, memory management 444, a file system 446, device drivers 448, and many other components and modules. To a certain degree, modern operating systems provide numerous levels of abstraction above the hardware level, including virtual memory, which provides to each application program and other computational entities a separate, large, linear memory-address space that is mapped by the operating system to various electronic memories and mass-storage devices. The scheduler orchestrates interleaved execution of various different application programs and higher-level computational entities, providing to each application program a virtual, stand-alone system devoted entirely to the application program. From the application program's standpoint, the application program executes continuously without concern for the need to share processor resources and other system resources with other application programs and higher-level computational entities. The device drivers abstract details of hardware-component operation, allowing application programs to employ the system-call interface for transmitting and receiving data to and from communications networks, mass-storage devices, and other I/O devices and subsystems. The file system 436 facilitates abstraction of mass-storage-device and memory resources as a high-level, easy-to-access, file-system interface. Thus, the development and evolution of the operating system has resulted in the generation of a type of multi-faceted virtual execution environment for application programs and other higher-level computational entities.

While the execution environments provided by operating systems have proved to be an enormously successful level of abstraction within computer systems, the operating-system-provided level of abstraction is nonetheless associated with difficulties and challenges for developers and users of application programs and other higher-level computational entities. One difficulty arises from the fact that there are many different operating systems that run within various different types of computer hardware. In many cases, popular application programs and computational systems are developed to run on only a subset of the available operating systems, and can therefore be executed within only a subset of the various different types of computer systems on which the operating systems are designed to run. Often, even when an application program or other computational system is ported to additional operating systems, the application program or other computational system can nonetheless run more efficiently on the operating systems for which the application program or other computational system was originally targeted. Another difficulty arises from the increasingly distributed nature of computer systems. Although distributed operating systems are the subject of considerable research and development efforts, many of the popular operating systems are designed primarily for execution on a single computer system. In many cases, it is difficult to move application programs, in real time, between the different computer systems of a distributed computer system for high-availability, fault-tolerance, and load-balancing purposes. The problems are even greater in heterogeneous distributed computer systems which include different types of hardware and devices running different types of operating systems. Operating systems continue to evolve, as a result of which certain older application programs and other computational entities may be incompatible with more recent versions of operating systems for which they are targeted, creating compatibility issues that are particularly difficult to manage in large distributed systems.

Figure 5A:
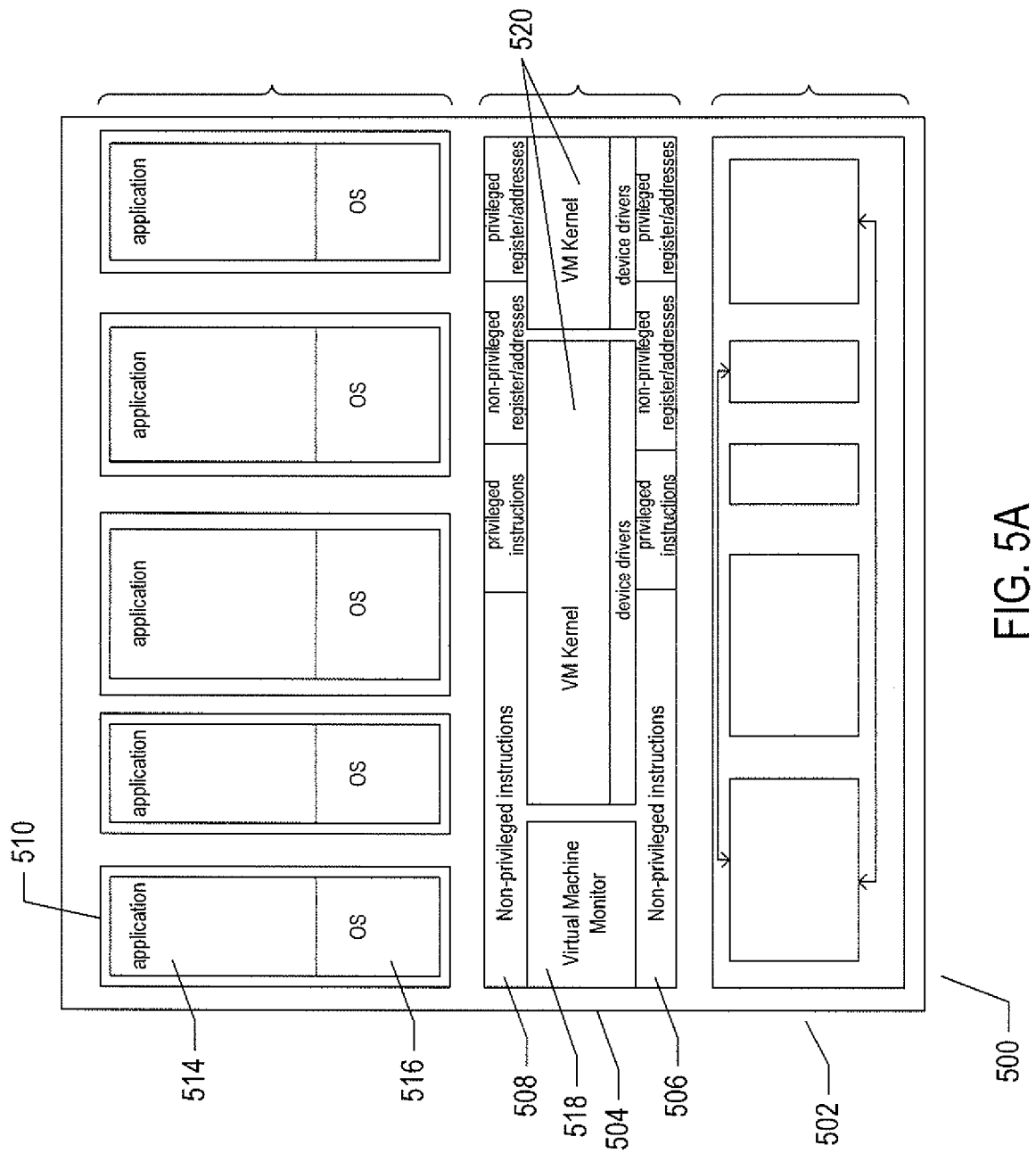

For all of these reasons, a higher level of abstraction, referred to as the "virtual machine," has been developed and evolved to further abstract computer hardware in order to address many difficulties and challenges associated with traditional computing systems, including the compatibility issues discussed above. FIGS. 5A-B illustrate two types of virtual machine and virtual-machine execution environments. FIGS. 5A-B use the same illustration conventions as used in FIG. 4. FIG. 5A shows a first type of virtualization. The computer system 500 in FIG. 5A includes the same hardware layer 502 as the hardware layer 402 shown in FIG. 4. However, rather than providing an operating system layer directly above the hardware layer, as in FIG. 4, the virtualized computing environment illustrated in FIG. 5A features a virtualization layer 504 that interfaces through a virtualization-layer/hardware-layer interface 506, equivalent to interface 416 in FIG. 4, to the hardware. The virtualization layer provides a hardware-like interface 508 to a number of virtual machines, such as virtual machine 510, executing above the virtualization layer in a virtual-machine layer 512. Each virtual machine includes one or more application programs or other higher-level computational entities packaged together with an operating system, referred to as a "guest operating system," such as application 514 and guest operating system 516 packaged together within virtual machine 510. Each virtual machine is thus equivalent to the operating-system layer 404 and application-program layer 406 in the general-purpose computer system shown in FIG. 4. Each guest operating system within a virtual machine interfaces to the virtualization-layer interface 508 rather than to the actual hardware interface 506. The virtualization layer partitions hardware resources into abstract virtual-hardware layers to which each guest operating system within a virtual machine interfaces. The guest operating systems within the virtual machines, in general, are unaware of the virtualization layer and operate as if they were directly accessing a true hardware interface. The virtualization layer ensures that each of the virtual machines currently executing within the virtual environment receive a fair allocation of underlying hardware resources and that all virtual machines receive sufficient resources to progress in execution. The virtualization-layer interface 508 may differ for different guest operating systems. For example, the virtualization layer is generally able to provide virtual hardware interfaces for a variety of different types of computer hardware. This allows, as one example, a virtual machine that includes a guest operating system designed for a particular computer architecture to run on hardware of a different architecture. The number of virtual machines need not be equal to the number of physical processors or even a multiple of the number of processors.

The virtualization layer includes a virtual-machine-monitor module 518 ("VMM") that virtualizes physical processors in the hardware layer to create virtual processors on which each of the virtual machines executes. For execution efficiency, the virtualization layer attempts to allow virtual machines to directly execute non-privileged instructions and to directly access non-privileged registers and memory. However, when the guest operating system within a virtual machine accesses virtual privileged instructions, virtual privileged registers, and virtual privileged memory through the virtualization-layer interface 508, the accesses result in execution of virtualization-layer code to simulate or emulate the privileged resources. The virtualization layer additionally includes a kernel module 520 that manages memory, communications, and data-storage machine resources on behalf of executing virtual machines ("VM kernel"). The VM kernel, for example, maintains shadow page tables on each virtual machine so that hardware-level virtual-memory facilities can be used to process memory accesses. The VM kernel additionally includes routines that implement virtual communications and data-storage devices as well as device drivers that directly control the operation of underlying hardware communications and data-storage devices. Similarly, the VM kernel virtualizes various other types of I/O devices, including keyboards, optical-disk drives, and other such devices. The virtualization layer essentially schedules execution of virtual machines much like an operating system schedules execution of application programs, so that the virtual machines each execute within a complete and fully functional virtual hardware layer.

FIG. 5B illustrates a second type of virtualization. In FIG. 5B, the computer system 540 includes the same hardware layer 542 and software layer 544 as the hardware layer 402 shown in FIG. 4. Several application programs 546 and 548 are shown running in the execution environment provided by the operating system. In addition, a virtualization layer 550 is also provided, in computer 540, but, unlike the virtualization layer 504 discussed with reference to FIG. 5A, virtualization layer 550 is layered above the operating system 544, referred to as the "host OS," and uses the operating system interface to access operating-system-provided functionality as well as the hardware. The virtualization layer 550 comprises primarily a VMM and a hardware-like interface 552, similar to hardware-like interface 508 in FIG. 5A. The virtualization-layer/hardware-layer interface 552, equivalent to interface 416 in FIG. 4, provides an execution environment for a number of virtual machines 556-558, each including one or more application programs or other higher-level computational entities packaged together with a guest operating system.

In FIGS. 5A-B, the layers are somewhat simplified for clarity of illustration. For example, portions of the virtualization layer 550 may reside within the host-operating-system kernel, such as a specialized driver incorporated into the host operating system to facilitate hardware access by the virtualization layer.

It should be noted that virtual hardware layers, virtualization layers, and guest operating systems are all physical entities that are implemented by computer instructions stored in physical data-storage devices, including electronic memories, mass-storage devices, optical disks, magnetic disks, and other such devices. The term "virtual" does not, in any way, imply that virtual hardware layers, virtualization layers, and guest operating systems are abstract or intangible. Virtual hardware layers, virtualization layers, and guest operating systems execute on physical processors of physical computer systems and control operation of the physical computer systems, including operations that alter the physical states of physical devices, including electronic memories and mass-storage devices. They are as physical and tangible as any other component of a computer since, such as power supplies, controllers, processors, busses, and data-storage devices.

Figure 6:
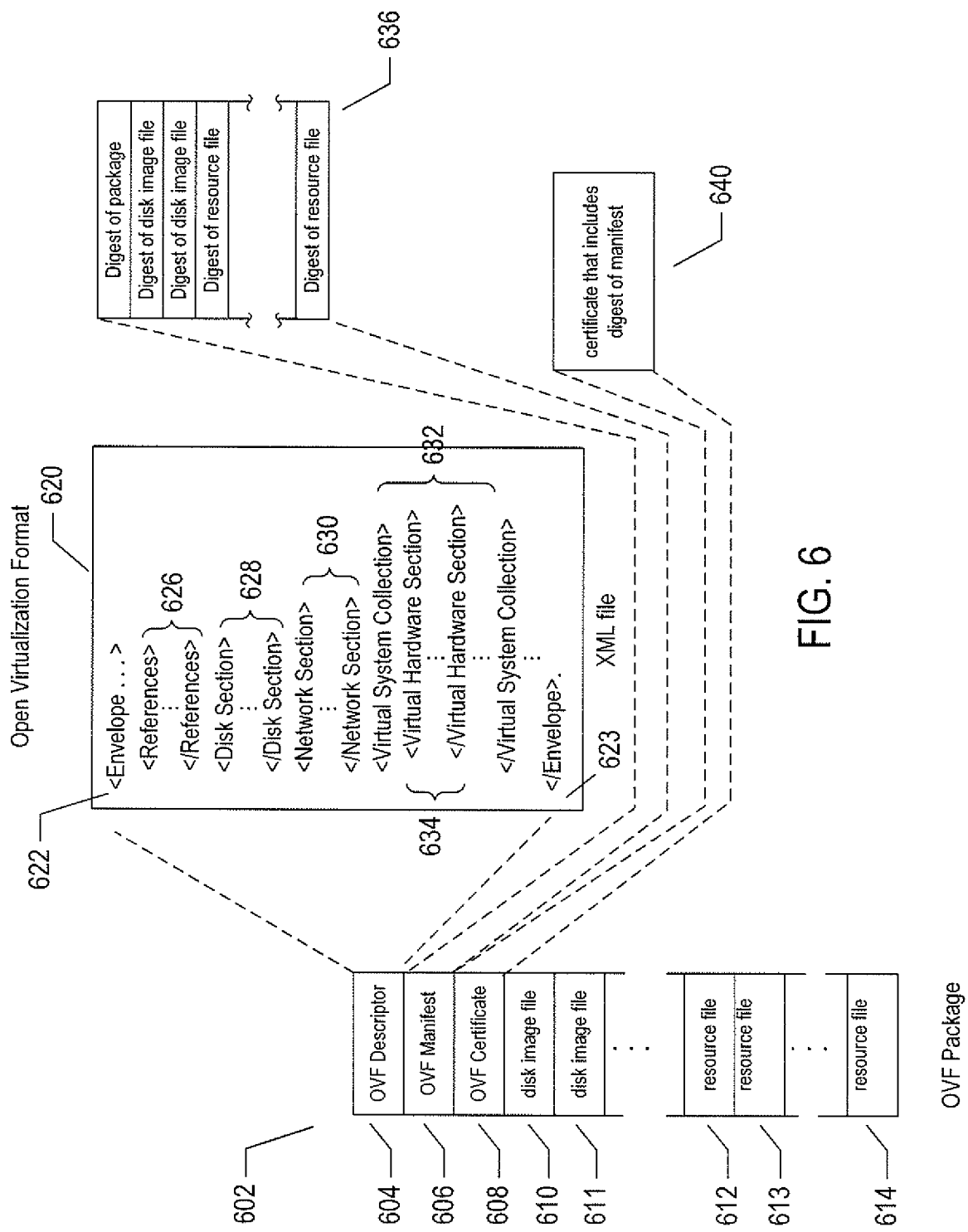
FIG. 6 illustrates an OVF package.

A virtual machine or virtual application, described below, is encapsulated within a data package for transmission, distribution, and loading into a virtual-execution environment. One public standard for virtual-machine encapsulation is referred to as the "open virtualization format" ("OVF"). The OVF standard specifies a format for digitally encoding a virtual machine within one or more data files. FIG. 6 illustrates an OVF package. An OVF package 602 includes an OVF descriptor 604, an OVF manifest 606, an OVF certificate 608, one or more disk-image files 610-611, and one or more resource files 612-614. The OVF package can be encoded and stored as a single file or as a set of files. The OVF descriptor 604 is an XML document 620 that includes a hierarchical set of elements, each demarcated by a beginning tag and an ending tag. The outermost, or highest-level, element is the envelope element, demarcated by tags 622 and 623. The next-level element includes a reference element 626 that includes references to all files that are part of the OVF package, a disk section 628 that contains meta information about all of the virtual disks included in the OVF package, a networks section 630 that includes meta information about all of the logical networks included in the OVF package, and a collection of virtual-machine configurations 632 which further includes hardware descriptions of each virtual machine 634. There are many additional hierarchical levels and elements within a typical OVF descriptor. The OVF descriptor is thus a self-describing, XML file that describes the contents of an OVF package. The OVF manifest 606 is a list of cryptographic-hash-function-generated digests 636 of the entire OVF package and of the various components of the OVF package. The OVF certificate 608 is an authentication certificate 640 that includes a digest of the manifest and that is cryptographically signed. Disk image files, such as disk image file 610, are digital encodings of the contents of virtual disks and resource files 612 are digitally encoded content, such as operating-system images. A virtual machine or a collection of virtual machines encapsulated together within a virtual application can thus be digitally encoded as one or more files within an OVF package that can be transmitted, distributed, and loaded using well-known tools for transmitting, distributing, and loading files. A virtual appliance is a software service that is delivered as a complete software stack installed within one or more virtual machines that is encoded within an OVF package.

Figure 7:
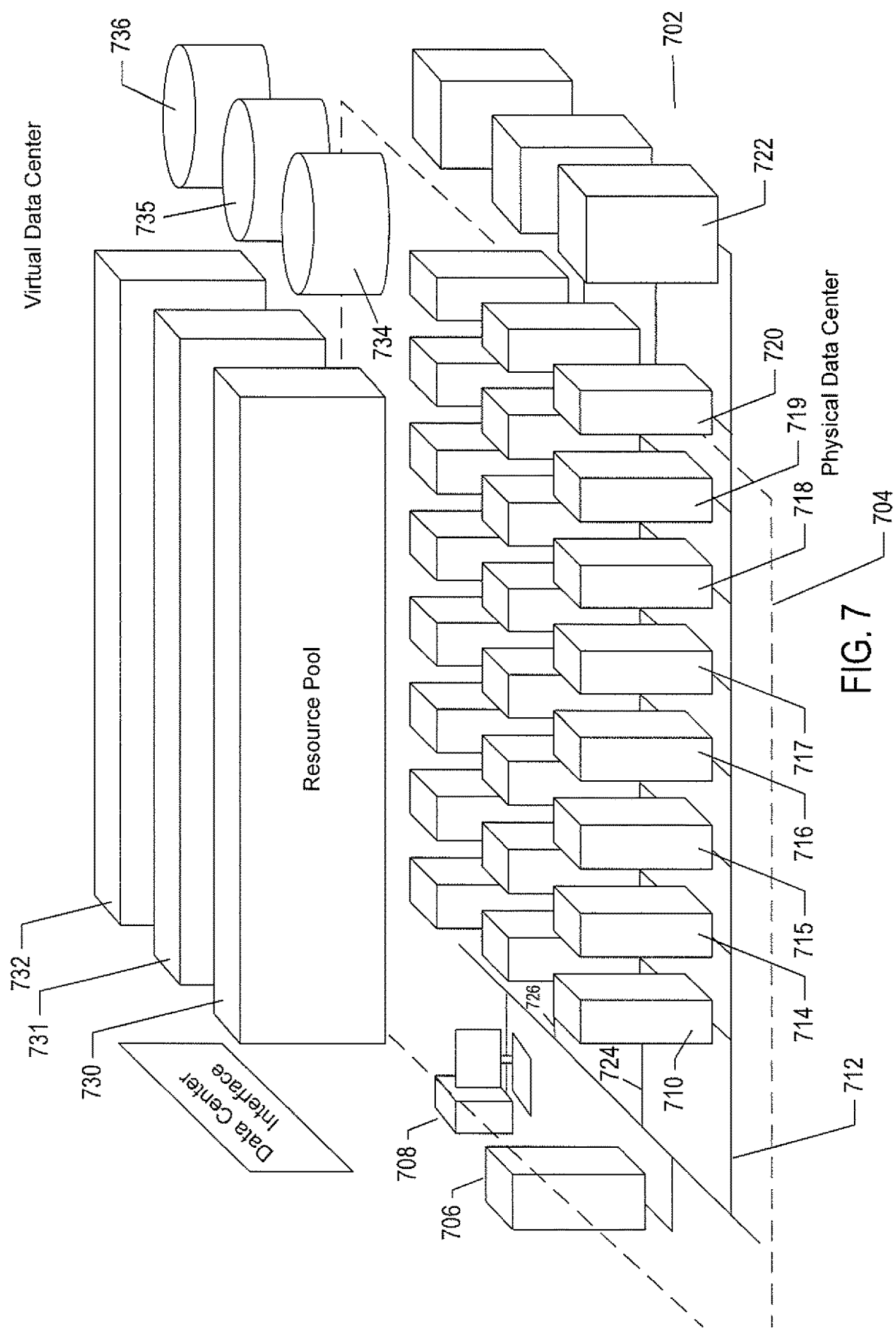
FIG. 7 illustrates virtual data centers provided as an abstraction of underlying physical-data-center hardware components.

The advent of virtual machines and virtual environments has alleviated many of the difficulties and challenges associated with traditional general-purpose computing. Machine and operating-system dependencies can be significantly reduced or entirely eliminated by packaging applications and operating systems together as virtual machines and virtual appliances that execute within virtual environments provided by virtualization layers running on many different types of computer hardware. A next level of abstraction, referred to as virtual data centers or virtual infrastructure, provide a data-center interface to virtual data centers computationally constructed within physical data centers. FIG. 7 illustrates virtual data centers provided as an abstraction of underlying physical-data-center hardware components. In FIG. 7, a physical data center 702 is shown below a virtual-interface plane 704. The physical data center consists of a virtual-data-center management server 706 and any of various different computers, such as PCs 708, on which a virtual-data-center management interface may be displayed to system administrators and other users. The physical data center additionally includes generally large numbers of server computers, such as server computer 710, that are coupled together by local area networks, such as local area network 712 that directly interconnects server computer 710 and 714-720 and a mass-storage array 722. The physical data center shown in FIG. 7 includes three local area networks 712, 724, and 726 that each directly interconnects a bank of eight servers and a mass-storage array. The individual server computers, such as server computer 710, each includes a virtualization layer and runs multiple virtual machines. Different physical data centers may include many different types of computers, networks, data-storage systems and devices connected according to many different types of connection topologies. The virtual-data-center abstraction layer 704, a logical abstraction layer shown by a plane in FIG. 7, abstracts the physical data center to a virtual data center comprising one or more resource pools, such as resource pools 730-732, one or more virtual data stores, such as virtual data stores 734-736, and one or more virtual networks. In certain implementations, the resource pools abstract banks of physical servers directly interconnected by a local area network.

Figure 8:
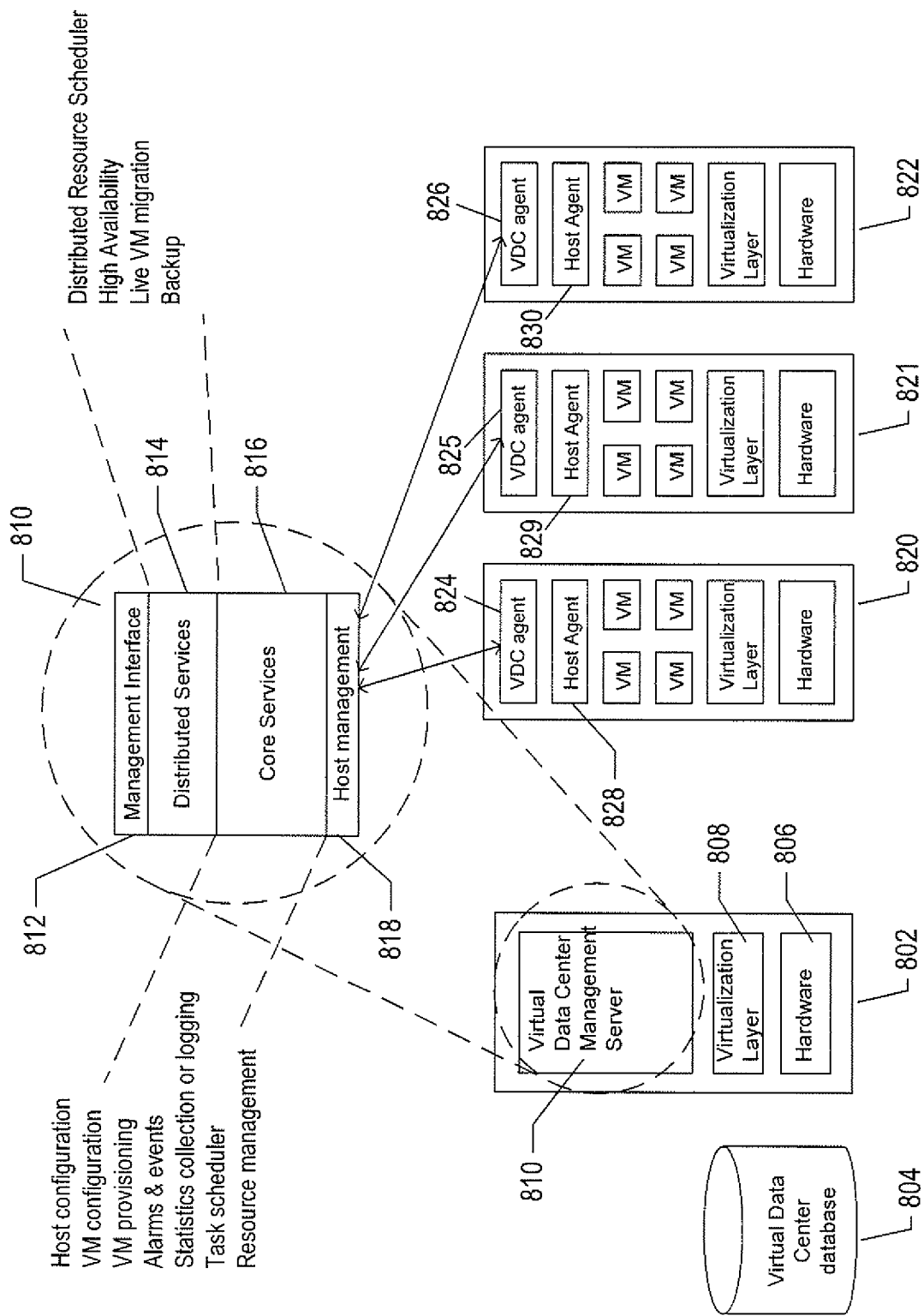
FIG. 8 illustrates virtual-machine components of a virtual-data-center management server and physical servers of a physical data center above which a virtual-data-center interface is provided by the virtual-data-center management server.

The virtual-data-center management interface allows provisioning and launching of virtual machines with respect to resource pools, virtual data stores, and virtual networks, so that virtual-data-center administrators need not be concerned with the identities of physical-data-center components used to execute particular virtual machines. Furthermore, the virtual-data-center management server includes functionality to migrate running virtual machines from one physical server to another in order to optimally or near optimally manage resource allocation, provide fault tolerance, and high availability by migrating virtual machines to most effectively utilize underlying physical hardware resources, to replace virtual machines disabled by physical hardware problems and failures, and to ensure that multiple virtual machines supporting a high-availability virtual appliance are executing on multiple physical computer systems so that the services provided by the virtual appliance are continuously accessible, even when one of the multiple virtual appliances becomes compute bound, data-access bound, suspends execution, or fails. Thus, the virtual data center layer of abstraction provides a virtual-data-center abstraction of physical data centers to simplify provisioning, launching, and maintenance of virtual machines and virtual appliances as well as to provide high-level, distributed functionalities that involve pooling the resources of individual physical servers and migrating virtual machines among physical servers to achieve load balancing, fault tolerance, and high availability. FIG. 8 illustrates virtual-machine components of a virtual-data-center management server and physical servers of a physical data center above which a virtual-data-center interface is provided by the virtual-data-center management server. The virtual-data-center management server 802 and a virtual-data-center database 804 comprise the physical components of the management component of the virtual data center. The virtual-data-center management server 802 includes a hardware layer 806 and virtualization layer 808, and runs a virtual-data-center management-server virtual machine 810 above the virtualization layer. Although shown as a single server in FIG. 8, the virtual-data-center management server ("VDC management server") may include two or more physical server computers that support multiple VDC-management-server virtual appliances. The virtual machine 810 includes a management-interface component 812, distributed services 814, core services 816, and a host-management interface 818. The management interface is accessed from any of various computers, such as the PC 708 shown in FIG. 7. The management interface allows the virtual-data-center administrator to configure a virtual data center, provision virtual machines, collect statistics and view log files for the virtual data center, and to carry out other, similar management tasks. The host-management interface 818 interfaces to virtual-data-center agents 824, 825, and 826 that execute as virtual machines within each of the physical servers of the physical data center that is abstracted to a virtual data center by the VDC management server.

The distributed services 814 include a distributed-resource scheduler that assigns virtual machines to execute within particular physical servers and that migrates virtual machines in order to most effectively make use of computational bandwidths, data-storage capacities, and network capacities of the physical data center. The distributed services further include a high-availability service that replicates and migrates virtual machines in order to ensure that virtual machines continue to execute despite problems and failures experienced by physical hardware components. The distributed services also include a live-virtual-machine migration service that temporarily halts execution of a virtual machine, encapsulates the virtual machine in an OVF package, transmits the OVF package to a different physical server, and restarts the virtual machine on the different physical server from a virtual-machine state recorded when execution of the virtual machine was halted. The distributed services also include a distributed backup service that provides centralized virtual-machine backup and restore.

The core services provided by the VDC management server include host configuration, virtual-machine configuration, virtual-machine provisioning, generation of virtual-data-center alarms and events, ongoing event logging and statistics collection, a task scheduler, and a resource-management module. Each physical server 820-822 also includes a host-agent virtual machine 828-830 through which the virtualization layer can be accessed via a virtual-infrastructure application programming interface ("API"). This interface allows a remote administrator or user to manage an individual server through the infrastructure API. The virtual-data-center agents 824-826 access virtualization-layer server information through the host agents. The virtual-data-center agents are primarily responsible for offloading certain of the virtual-data-center management-server functions specific to a particular physical server to that physical server. The virtual-data-center agents relay and enforce resource allocations made by the VDC management server, relay virtual-machine provisioning and configuration-change commands to host agents, monitor and collect performance statistics, alarms, and events communicated to the virtual-data-center agents by the local host agents through the interface API, and to carry out other, similar virtual-data-management tasks.

The virtual-data-center abstraction provides a convenient and efficient level of abstraction for exposing the computational resources of a cloud-computing facility to cloud-computing-infrastructure users. A cloud-director management server exposes virtual resources of a cloud-computing facility to cloud-computing-infrastructure users. In addition, the cloud director introduces a multi-tenancy layer of abstraction, which partitions VDCs into tenant-associated VDCs that can each be allocated to a particular individual tenant or tenant organization, both referred to as a "tenant." A given tenant can be provided one or more tenant-associated VDCs by a cloud director managing the multi-tenancy layer of abstraction within a cloud-computing facility. The cloud services interface (308 in FIG. 3) exposes a virtual-data-center management interface that abstracts the physical data center.

Figure 9:
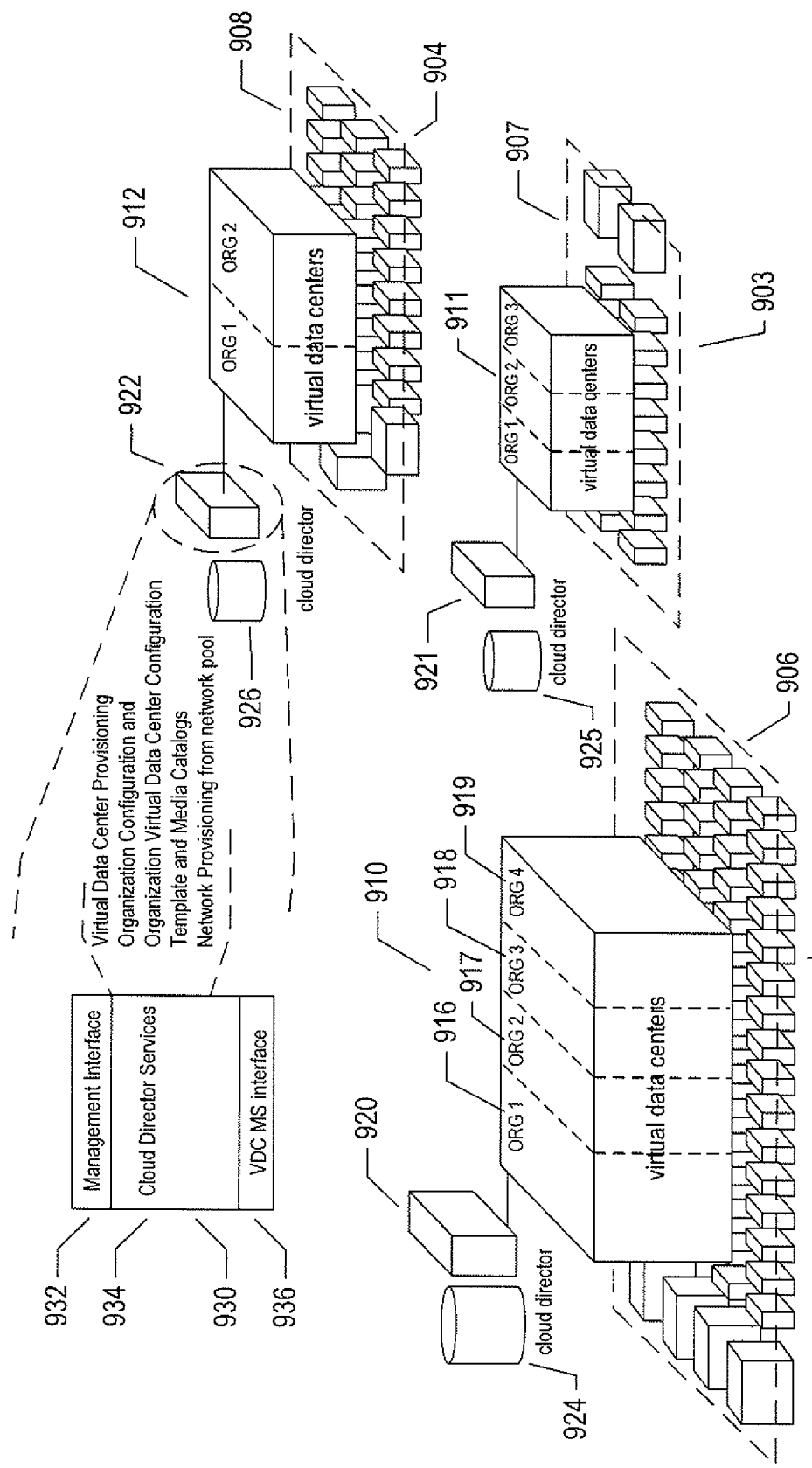
FIG. 9 illustrates a cloud-director level of abstraction.

FIG. 9 illustrates a cloud-director level of abstraction. In FIG. 9, three different physical data centers 902-904 are shown below planes representing the cloud-director layer of abstraction 906-908. Above the planes representing the cloud-director level of abstraction, multi-tenant virtual data centers 910-912 are shown. The resources of these multi-tenant virtual data centers are securely partitioned in order to provide secure virtual data centers to multiple tenants, or cloud-services-accessing organizations. For example, a cloud-services-provider virtual data center 910 is partitioned into four different tenant-associated virtual-data centers within a multi-tenant virtual data center for four different tenants 916-919. Each multi-tenant virtual data center is managed by a cloud director comprising one or more cloud-director servers 920-922 and associated cloud-director databases 924-926. Each cloud-director server or servers runs a cloud-director virtual appliance 930 that includes a cloud-director management interface 932, a set of cloud-director services 934, and a virtual-data-center management-server interface 936. The cloud-director services include an interface and tools for provisioning multi-tenant virtual data center virtual data centers on behalf of tenants, tools and interfaces for configuring and managing tenant organizations, tools and services for organization of virtual data centers and tenant-associated virtual data centers within the multi-tenant virtual data center, services associated with template and media catalogs, and provisioning of virtualization networks from a network pool. Templates are virtual machines that each contains an OS and/or one or more virtual machines containing applications. A template may include much of the detailed contents of virtual machines and virtual appliances that are encoded within OVF packages, so that the task of configuring a virtual machine or virtual appliance is significantly simplified, requiring only deployment of one OVF package. These templates are stored in catalogs within a tenant's virtual-data center. These catalogs are used for developing and staging new virtual appliances and published catalogs are used for sharing templates in virtual appliances across organizations. Catalogs may include OS images and other information relevant to construction, distribution, and provisioning of virtual appliances.

Considering FIGS. 7 and 9, the VDC-server and cloud-director layers of abstraction can be seen, as discussed above, to facilitate employment of the virtual-data-center concept within private and public clouds. However, this level of abstraction does not fully facilitate aggregation of single-tenant and multi-tenant virtual data centers into heterogeneous or homogeneous aggregations of cloud-computing facilities.

Figure 10:
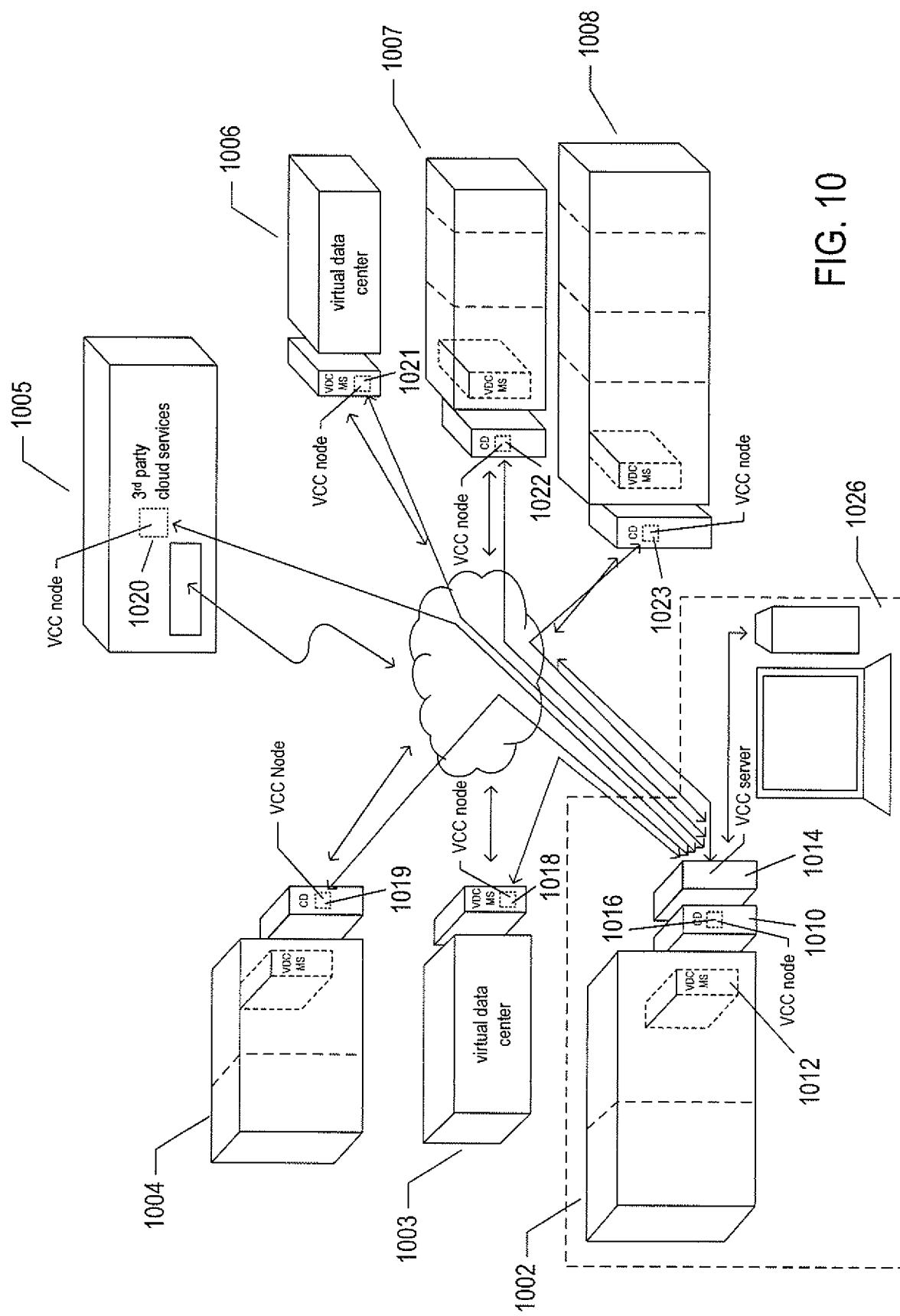
FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds.

FIG. 10 illustrates virtual-cloud-connector nodes ("VCC nodes") and a VCC server, components of a distributed system that provides multi-cloud aggregation and that includes a cloud-connector server and cloud-connector nodes that cooperate to provide services that are distributed across multiple clouds. VMware vCloud™ VCC servers and nodes are one example of VCC server and nodes. In FIG. 10, seven different cloud-computing facilities are illustrated 1002-1008. Cloud-computing facility 1002 is a private multi-tenant cloud with a cloud director 1010 that interfaces to a VDC management server 1012 to provide a multi-tenant private cloud comprising multiple tenant-associated virtual data centers. The remaining cloud-computing facilities 1003-1008 may be either public or private cloud-computing facilities and may be single-tenant virtual data centers, such as virtual data centers 1003 and 1006, multi-tenant virtual data centers, such as multi-tenant virtual data centers 1004 and 1007-1008, or any of various different kinds of third-party cloud-services facilities, such as third-party cloud-services facility 1005. An additional component, the VCC server 1014, acting as a controller is included in the private cloud-computing facility 1002 and interfaces to a VCC node 1016 that runs as a virtual appliance within the cloud director 1010. A VCC server may also run as a virtual appliance within a VDC management server that manages a single-tenant private cloud. The VCC server 1014 additionally interfaces, through the Internet, to VCC node virtual appliances executing within remote VDC management servers, remote cloud directors, or within the third-party cloud services 1018-1023. The VCC server provides a VCC server interface that can be displayed on a local or remote terminal, PC, or other computer system 1026 to allow a cloud-aggregation administrator or other user to access VCC-server-provided aggregate-cloud distributed services. In general, the cloud-computing facilities that together form a multiple-cloud-computing aggregation through distributed services provided by the VCC server and VCC nodes are geographically and operationally distinct.

Event-Message Generation

Figure 11:
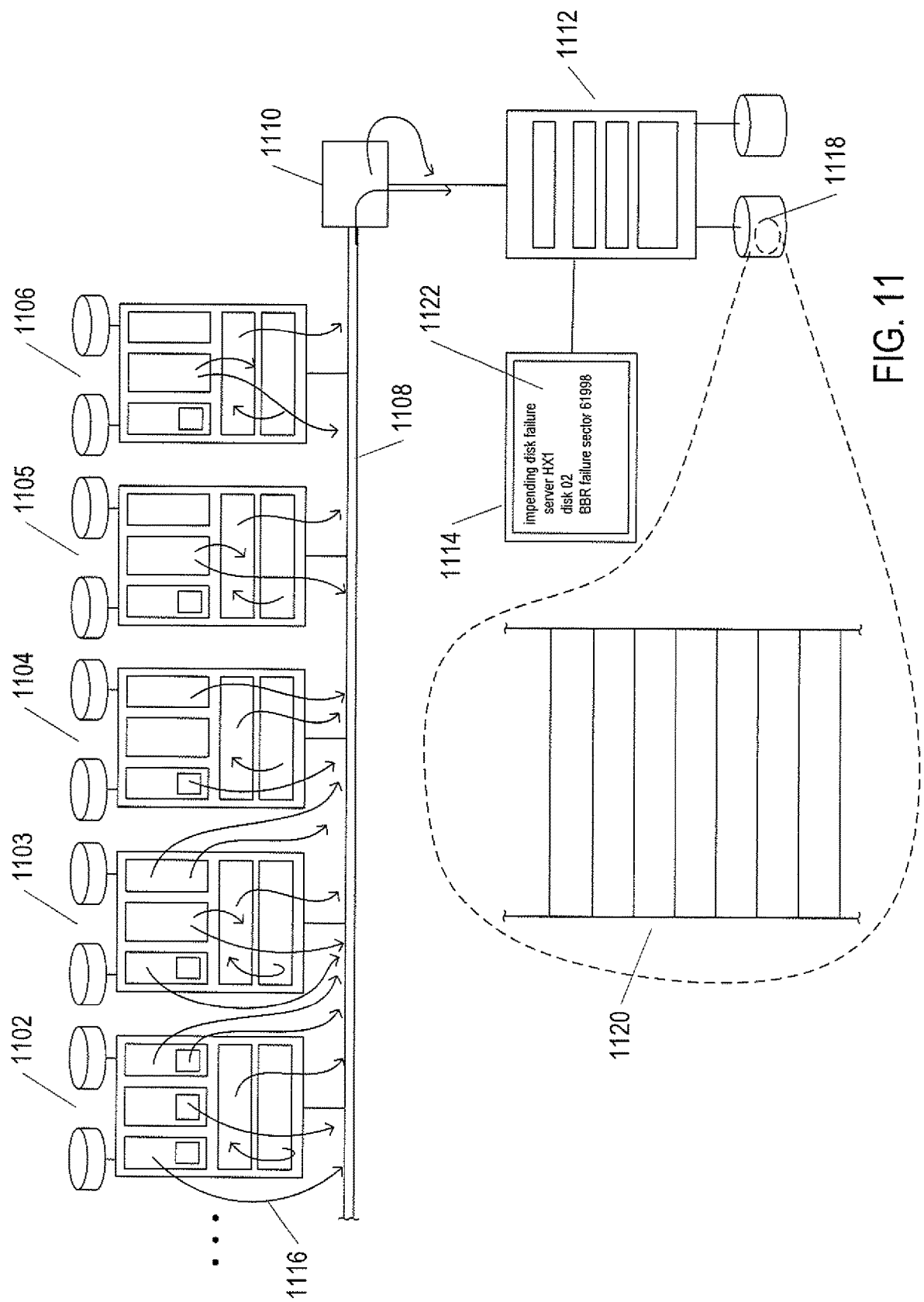
FIG. 11 illustrates a simple example of event-message logging and analysis.

FIG. 11 illustrates a simple example of event-message logging and analysis. In FIG. 11, a number of computer systems 1102-1106 within a distributed computing system are linked together by an electronic communications medium 1108 and additionally linked through a communications bridge/router 1110 to an administration computer system 1112 that includes an administrative console 1114. As indicated by curved arrows, such as curved arrow 1116, multiple components within each of the discrete computer systems 1102 and 1106 as well as the communications bridge/router 1110 generate event messages which are ultimately transmitted to the administration computer 1112. Event messages may be relatively directly transmitted from a component within a discrete computer system to the administration computer or may be collected at various hierarchical levels within a discrete computer and then forwarded from an event-message-collecting entity within the discrete computer to the administration computer. The administration computer 1112 may filter and analyze the received event messages, as they are received, in order to detect various operational anomalies and impending failure conditions. In addition, the administration computer collects and stores the received event messages in a data-storage device or appliance 1118 as large event-message log files 1120. Either through real-time analysis or through analysis of log files, the administration computer may detect operational anomalies and conditions for which the administration computer displays warnings and informational displays, such as the warning 1122 shown in FIG. 11 displayed on the administration-computer display device 1114.

FIG. 12 shows a small, 11-entry portion of a log file from a distributed computer system. In FIG. 12, each rectangular cell, such as rectangular cell 1202, of the portion of the log file 1204 represents a single stored event message. In general, event messages are relatively cryptic, including generally only one or two natural-language sentences or phrases as well as various types of file names, path names, and, perhaps most importantly, various alphanumeric parameters. For example, log entry 1202 includes a short natural-language phrase 1206, date 1208 and time 1210 parameters, as well as a numeric parameter 1212 which appears to identify a particular host computer.

Figure 13:
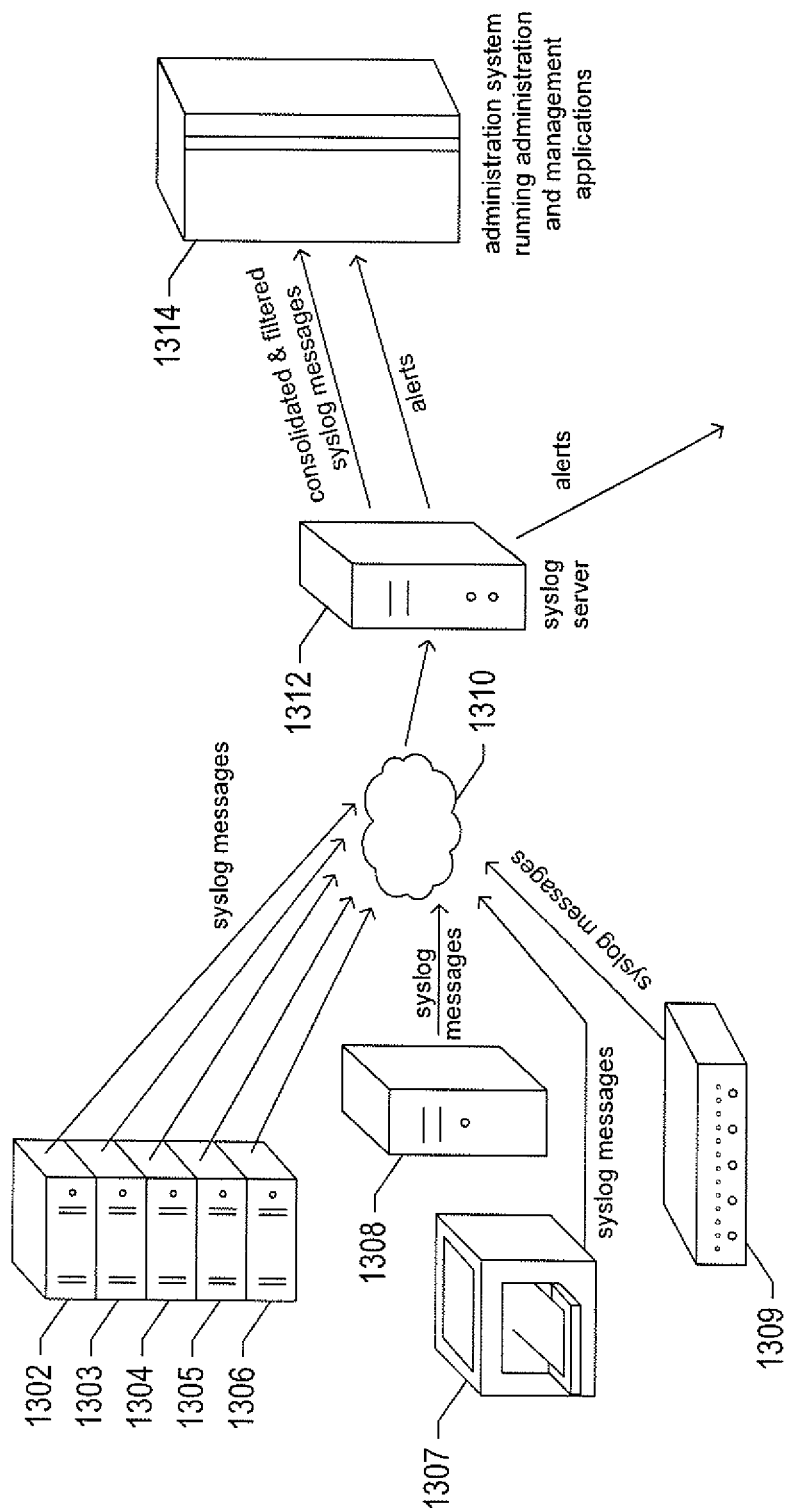
FIG. 13 illustrates the use of syslog messaging for transmitting, storing, and retrieving event messages within a distributed computer system.

FIG. 13 illustrates the use of syslog messaging for transmitting, storing, and retrieving event messages within a distributed computer system. The syslog protocol and message-logging standard was developed in the 1980s. Syslog-message originators within various system components 1302-1309, such as blade servers 1302-1306, printers 1307, stand-alone servers 1308, and communications components, including routers 1309, transmit syslog messages through various communications media 1310, including a local-area networks and/or the Internet, to a syslog server 1312, which processes and stores the syslog messages. The syslog server may additionally generate alerts, upon receiving certain types of syslog messages, and may also provide an interface through which remote systems, such as an administration system 1314 within the distributed computer system, access the stored syslog messages to retrieve sets of consolidated syslog messages filtered and additionally processed by the syslog server on behalf of the administration system. In many distributed computer systems, the syslog protocol and one or more syslog servers are used to provide a significant portion of the event-message generation, transmission, storage, and initial processing tasks previously discussed with reference to FIG. 11.

Figure 14:
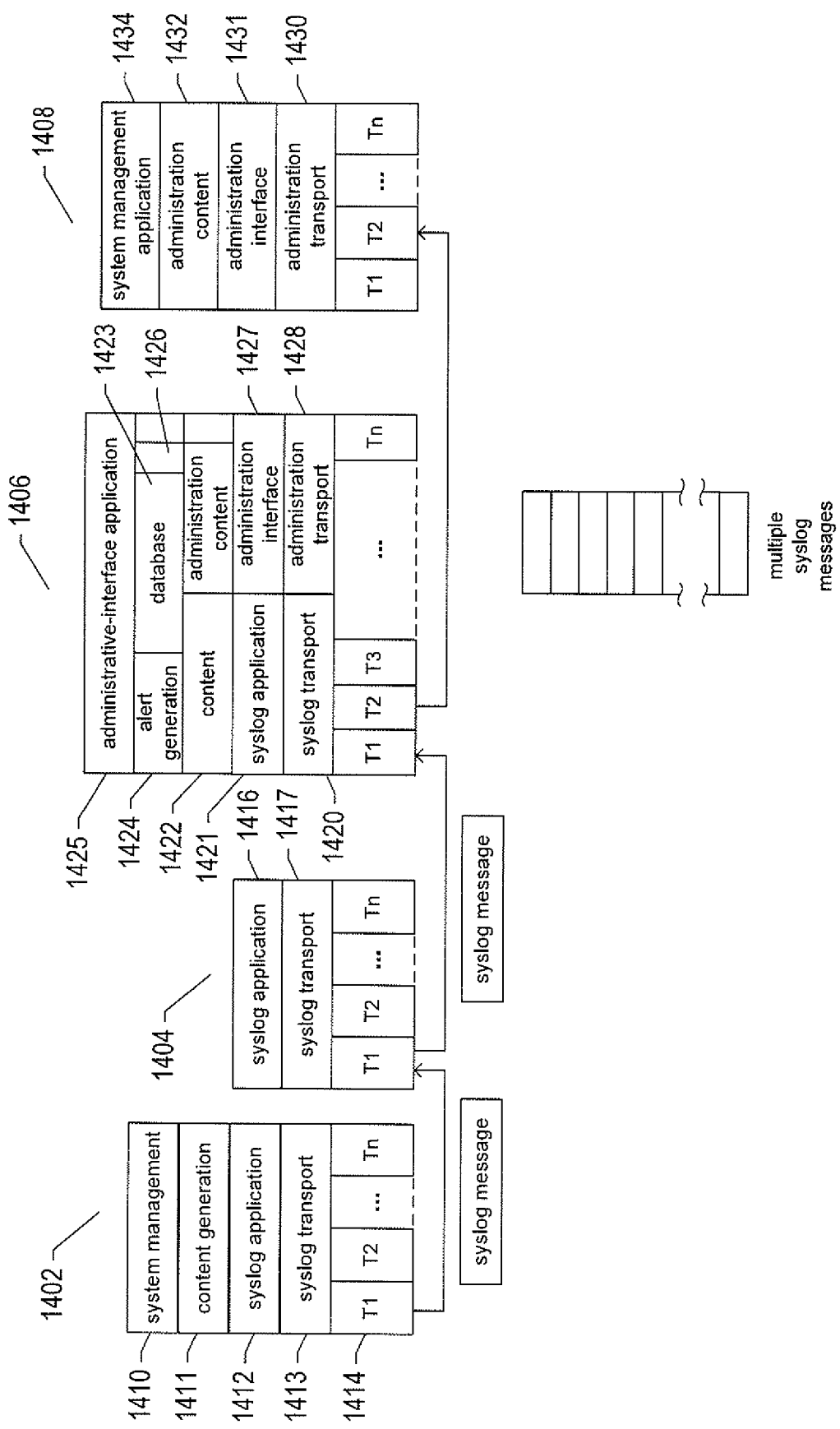
FIG. 14 illustrates the logical components of a syslog-messaging subcomponent of the distributed computing system.

FIG. 14 illustrates the logical components of a syslog-messaging subcomponent of the distributed computing system. FIG. 14 shows layered logical subcomponents within a syslog originator 1402, a syslog router 1404, a syslog server 1406, and an administration-computer client 1408 of the syslog server. The syslog originator 1402 is a distributed-computer-system component, as discussed above with reference to FIG. 13. The distributed-computer-system component includes a system-management layer 1410 that detects various conditions and states within the distributed-computer-system component. This system-management layer can be thought of as an application layer within the component of the distributed-computing system, although the system-management layer within a given system component may be quite thin and small, comprising one or a few routines that detect and report various states and conditions within the distributed-computer-system component 1402. The content-generation layer 1411 within the distributed-computer-system component 1402 generates event messages for the states and conditions, reported by the system-management layer, for consumption by the administration-computer client 1408 of the syslog server. The syslog-application layer 1412 packages the system-management event messages generated by the content-generation layer into syslog messages and determines to which syslog server to transmit the syslog messages. The syslog-transport layer 1413 selects one or more operating-system-provided communications-hardware interfaces for each syslog message generated by the syslog-application layer and inputs the syslog message to the selected one or more communications-hardware interfaces for transmission to one or more syslog servers. In FIG. 14, these communications-hardware interfaces are shown in a lowest layer in each of the components of the syslog-messaging subcomponent of the distributed computing system, such as layer 1414 in the distributed-computing-system component 1402.

The syslog router 1404 receive syslog messages from syslog originators and forwards the syslog messages to one or more syslog servers, either directly or through downstream syslog routers. In certain distributed-computer systems, one or more syslog originators may reside within the same computer system that hosts a syslog server. In other distributed-computer systems, syslog originators may be connected to one or more syslog servers through various different communications media bridged by syslog routers and, of course, by underlying communications hardware components. The syslog router includes a syslog-application level 1416 and a syslog-transport level 1417.

The syslog server 1406 also includes a syslog-transport layer 1420, a syslog-application layer 1421, and a syslog-content layer 1422 with functionalities that parallel the same syslog layers in the syslog originator 1402 and syslog router 1404. In addition, the syslog server includes a database interface 1423, an alert-generation interface 1424, and an administrative-interface application 1425 that provides various types of services to the administration-computer client 1408 and other syslog-server clients. On the administration-client side, the syslog server includes lower layers 1426-1428 that parallel the lower syslog-server layers 1420-1422.

The administration-computer-system client 1408 of the syslog server includes a transport layer 1430, an administration-interface layer 1431, and a content 1432 layer as well as a system-management-application layer 1434. Event messages have meaning only at the system-management layers 1410 and 1434. The lower layers of the components shown in FIG. 14 are syslog-messaging layers and operating system and hardware layers and provide message-transport services to the system-management layers. Syslog messaging is commonly used within distributed-computer systems because it is a well-developed technology that is incorporated in a wide variety of different types of computer-system components.

Figure 15:
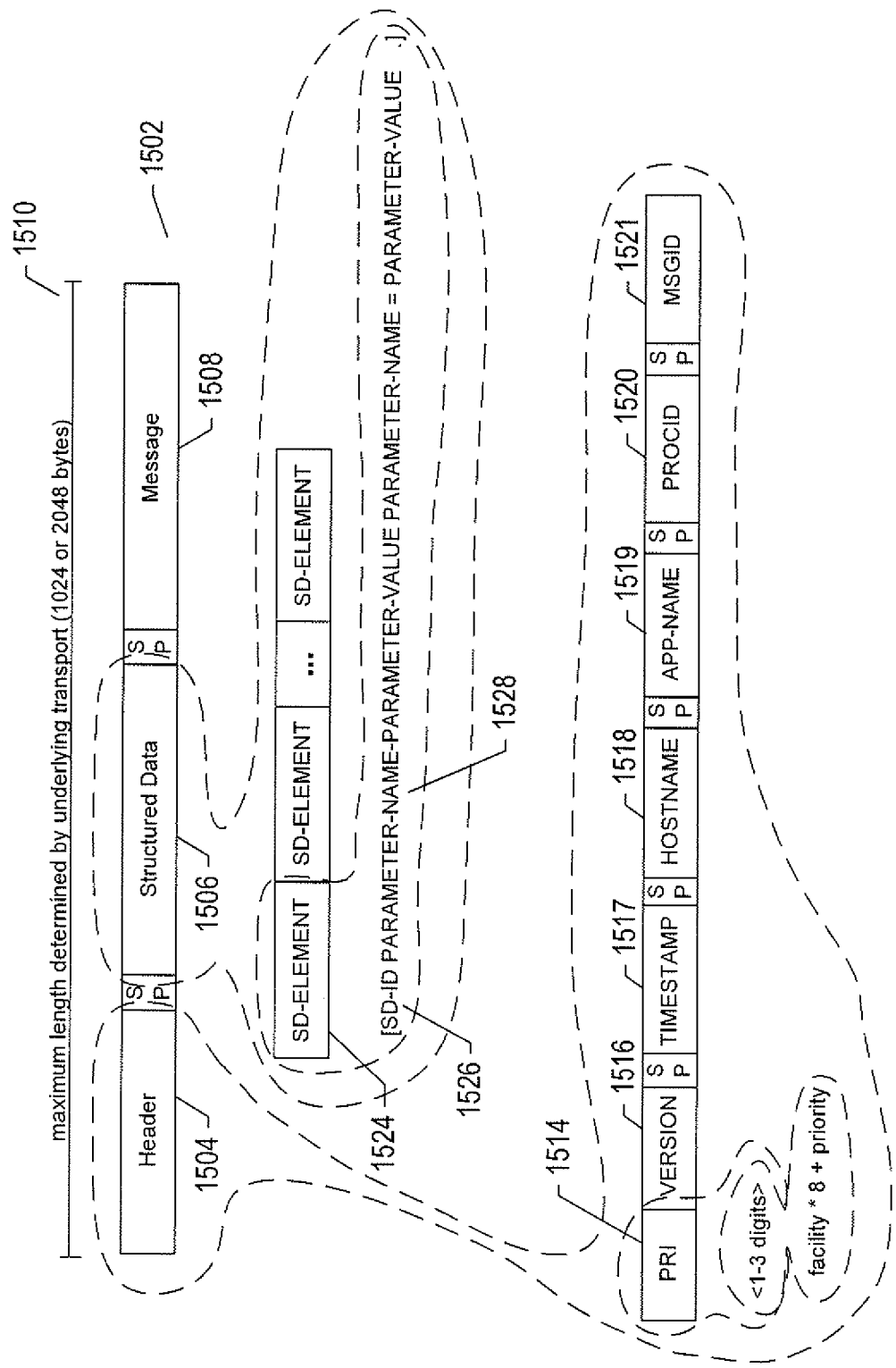
FIG. 15 illustrates the structure and contents of a syslog message.

FIG. 15 illustrates the structure and contents of a syslog message. A syslog message 1502 is a text or character-based message that includes a header portion 1504, a structured-data 1506, and an unstructured-message portion 1508 separated from one another by spaces. It is the unstructured message portion that contains an application-level event message. As indicated by annotation 1510 above the syslog message 1502 in FIG. 15, the syslog standard specifies that syslog messages of up to a specified length of either 1024 or 2048 bytes need to be supported by syslog servers. Syslog messages are generally transmitted using the UDP or TCP communications protocols. In the former case, there is no guarantee of delivery. The syslog protocol is a simplex protocol, providing only for transmission of syslog messages from syslog originators to one or more syslog servers. Details of the syslog-message header 1504 are shown in inset 1512. An initial PRI field 1514 encodes, in one to three decimal digits, an indication of the type of syslog originator, or facility, where the message is generated and an indication of a priority associated with the message. Additional header fields include an indication of the syslog version 1516, a timestamp 1517, a host name 1518 that generally includes the communications address of a syslog server, an application name 1519, a process ID 1520, and a message ID 1521. The structured-data portion of a syslog message 1506 includes zero, one, or more syslog-data elements, such as syslog-data element 1524, that each includes a syslog-data identifier 1526 and one or more parameter-name/parameter-value pairs, such as parameter-names/parameter-value pair 1528.

Figure 16:
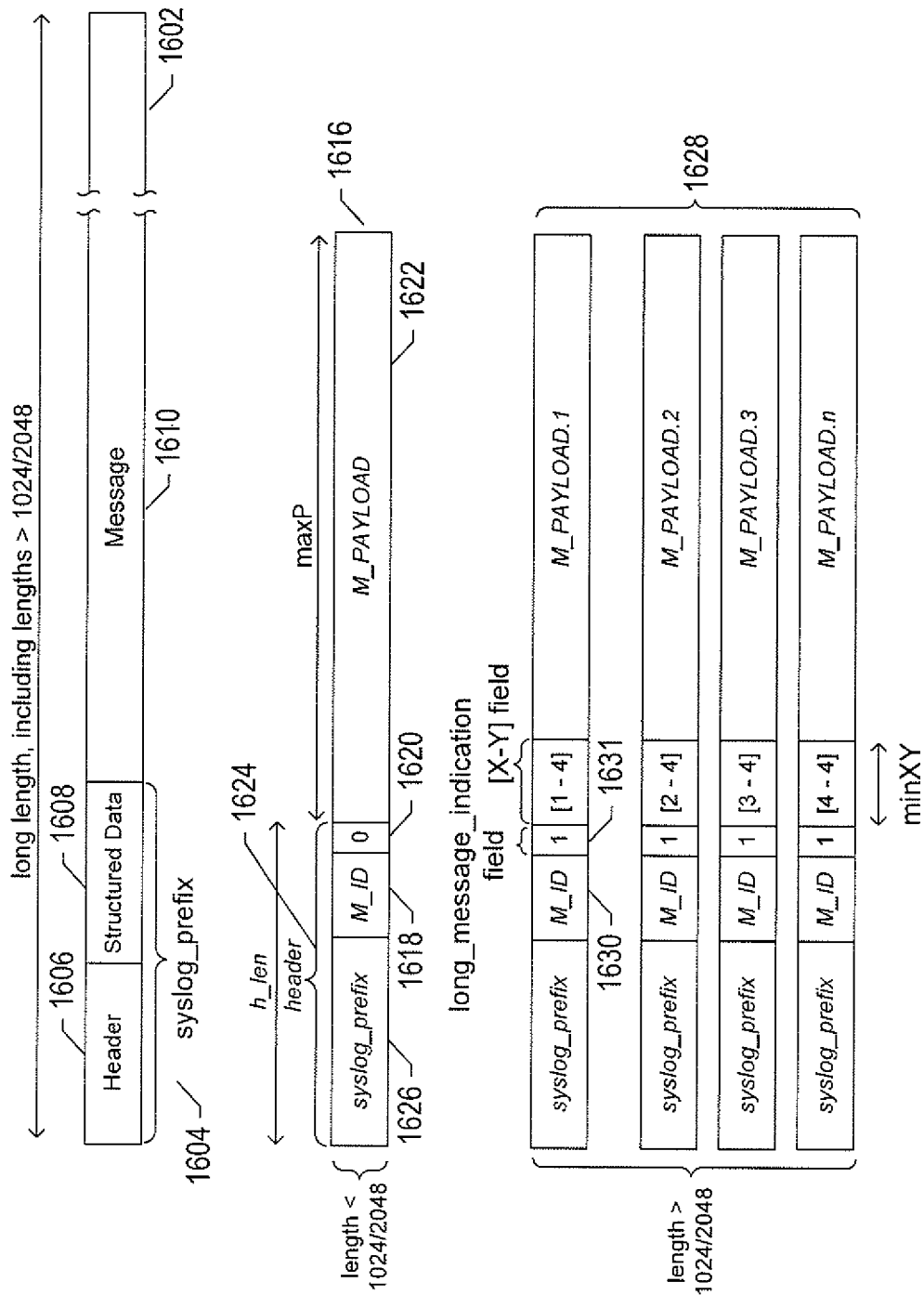
FIG. 16 illustrates the traditional fixed-length syslog message and a multi-part application-level-tunnel message.

Methods and Systems that Implement an Application-Level Tunnel Through which Long Syslog Messages are Transmitted FIG. 16 illustrates the traditional fixed-length syslog message and a multi-part application-level-tunnel message. As discussed above, with reference to FIG. 15, a standard syslog message 1602 includes a syslog-prefix portion 1604 comprising a header 1606 and structured-data portion 1608 as well as an unstructured-message portion 1610. The unstructured-message portion is unstructured with respect to the syslog protocol, but, of course, may contain application-level structured and formatted data, such as data encoding and event message. As discussed above, traditional syslog messages are specified, by the syslog standard, to have lengths up to at least a specified size, but specific implementations may support even longer syslog messages. Because syslog messages of one implementation may exceed the maximum lengths permitted by another implementation, problems arise when syslog messaging is used as the transport, forwarding, and temporary-storage layer below communicating application-level entities, such as the system-management layers within components of a distributed-computer system and an administration-computer system within the distributed-computer system. In general, the syslog-messaging layer is separately implemented in each of many different distributed-computer-system components and in the syslog server, and these implementations are separate and distinct from the implementation of the application level, including implementations of event-message generating and event-message processing within a distributed-computing system. The application-level implementations may be frequently updated and revised to include additional functionality. Such updates may include functionalities that attempt to transmit event messages of greater length than the maximum length of syslog messages assumed by syslog-server implementation of certain distributed-computer-system components. Transmission of such event messages may result in errors and even system crashes.

Currently, there are no convenient and workable solutions to the problem of transporting long event messages through an underlying syslog-messaging layer with maximum-message-length constraints. One solution is to re-implement the syslog-messaging layer, which may involve recompiling and reloading syslog-messaging implementations in each of many different distributed-computer-system components and in one or more syslog servers. This is not an attractive solution for many distributed-computer-system managers and administrators, due to the potential complexity of the task, the possibility of introducing additional problems, and the likelihood of needing to reimplement the syslog-messaging layer again, in the future, to accommodate additional changes to the application layer. Another solution is to suffer truncation of event messages that exceed syslog-messaging maximum lengths. However, event-message truncation can lead to a variety of complexities and problems at the application level and may also result in failures of the underlying syslog-messaging layer.

The current document discloses a different solution to the above-discussed problem. The currently disclosed solution involves implementing an application-level tunnel that transmits along application-level event messages that are partitioned into multiple, smaller portions, each of which can be packaged in a traditional syslog message and transported through the underlying syslog-messaging layer. At the administration-computer-system side of the application-level tunnel, multiple portions of a long event message are collected and recombined into the original long event message for consumption by the administration-computer-system application.

Two different types of application-level event messages are transmitted through the application-level tunnel. For event messages that can be packaged into a single syslog message, a single application-level event message 1616 is transmitted through the application-level tunnel. The single application-level event message comprises an application-level message-identifier field, M_ID, 1618, a long-message-indication field 1620 containing the decimal-digit value "0," and an application-level-message payload, M_PAYLOAD, 1622. The maximum size of the application-level-message payload, maxP, is equal to the maximum size for a syslog message minus the length of the header 1624, h_len, that includes the syslog prefix 1626, the application-level message-identifier field 1618, and the long-message-indication field 1620. For an event message that cannot be packaged into a single syslog message, the event message is packaged into multiple syslog messages 1628. Each of the multiple syslog messages contain a long-event-message portion that includes, in addition to the application-level message field 1630 and the long-message-indication field 1631, an [X–Y] field 1632. The value X in the [X–Y] field is a sequence number for the long-event-message portion and the value Y is the total number of long-event-message portions that together comprise the event message. Note that, in each of the multiple syslog messages that contain long-event-message portions 1628, the long-message-indication field, such as long-message-indication field 1631, contains the value "1," or TRUE. In the currently described implementation, the application-level message-identifier field has a fixed length. However, the length of the [X–Y] field varies depending on the total number of long-event-message portions that together comprise a long event message as well as the sequence number of the long event message containing the [X–Y] field. The application-level message-identifier field, long-message-indication field, and [X–Y] field together provide sufficient information for detecting, on the receiving side, reception of a long-event-message portion, collection of multiple long-event-message portions over a period of time, and reassembly of a long event message from the payloads within the long-event-message portions corresponding to the long event message.

Figure 17:
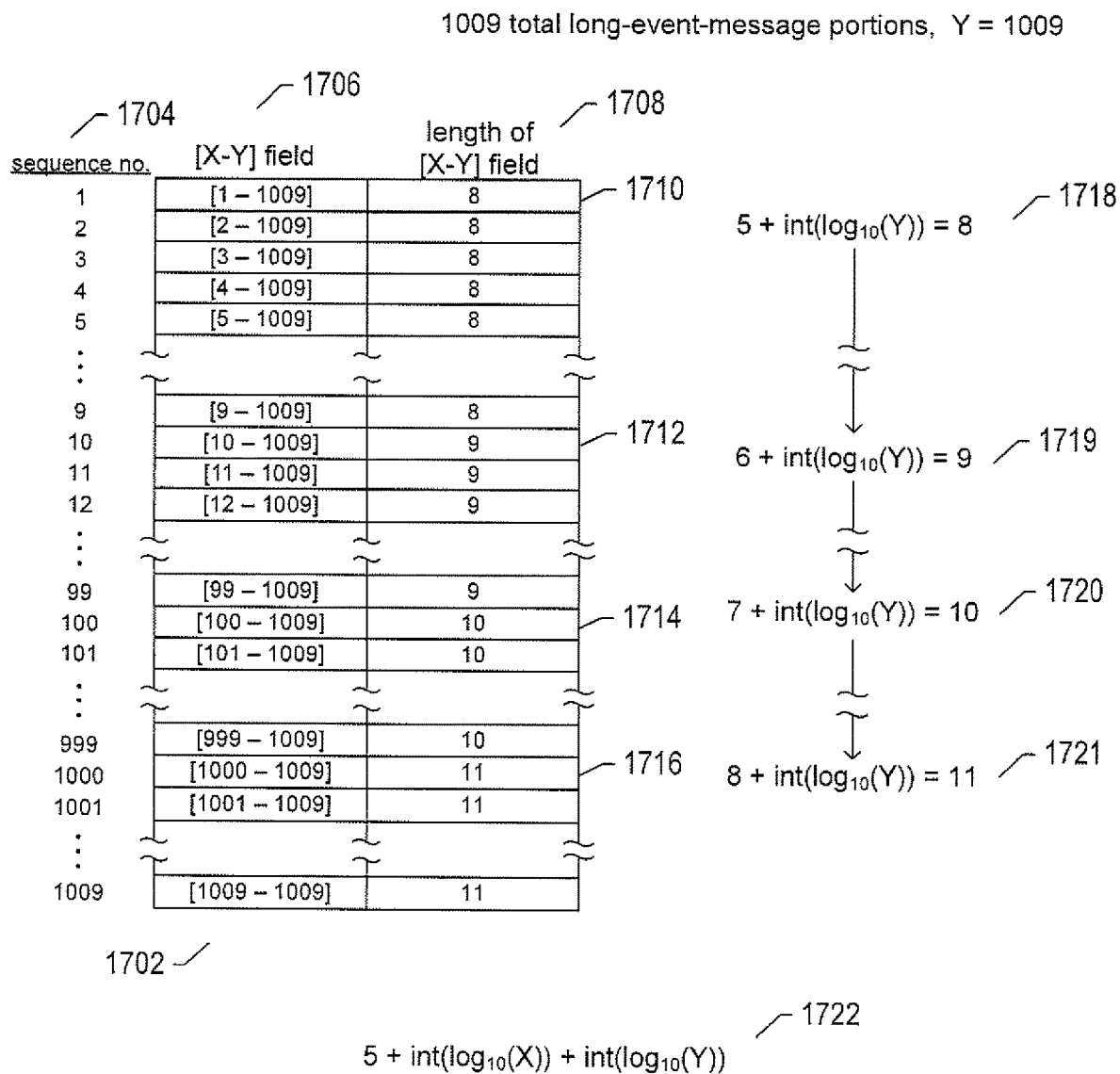
FIG. 17 illustrates the variable size of the [X-Y] field within long-event-message portions.

FIG. 17 illustrates the variable size of the [X–Y] field within long-event-message portions. In the example shown in FIG. 17, there are 1009 long-event-message portions that together comprise a long event message. In table 1702, for each of selected sequence numbers in column 1704, the [X–Y] field of the long-event-message portion corresponding to the sequence number is shown in column 1706 and the length, in characters or bytes, of the [X–Y] field is shown in column 1708. There are no spaces in the [X–Y] field. Thus, the [X–Y] field for the first long-event-message portion is [1-1009], as shown in the first row 1710 of table 1702, and has a length of 8. The length of the [X–Y] field increases to 9 for the $10^{th}$ long-event-message portion, as shown in row 1712 of table 1702, increases to 10 for the $100^{th}$ long-event-message portion, as shown in row 1714 of table 1702, and increases to 11 for the $1000^{th}$ long-event-message portion, as shown in row 1716 of table 1702. As shown by expressions 1718-1721, the number of characters in the [X–Y] field depends on the logarithm, to the base 10, of the total number of long-event-message portions Y. As shown by expression 1722 in FIG. 17, the number of characters in the [X–Y] field can be computed as the sum of 5, the integer portion of the logarithm of the sequence number X, and the integer portion of the logarithm of the total number of long-event-message portions Y.

Figure 18A:
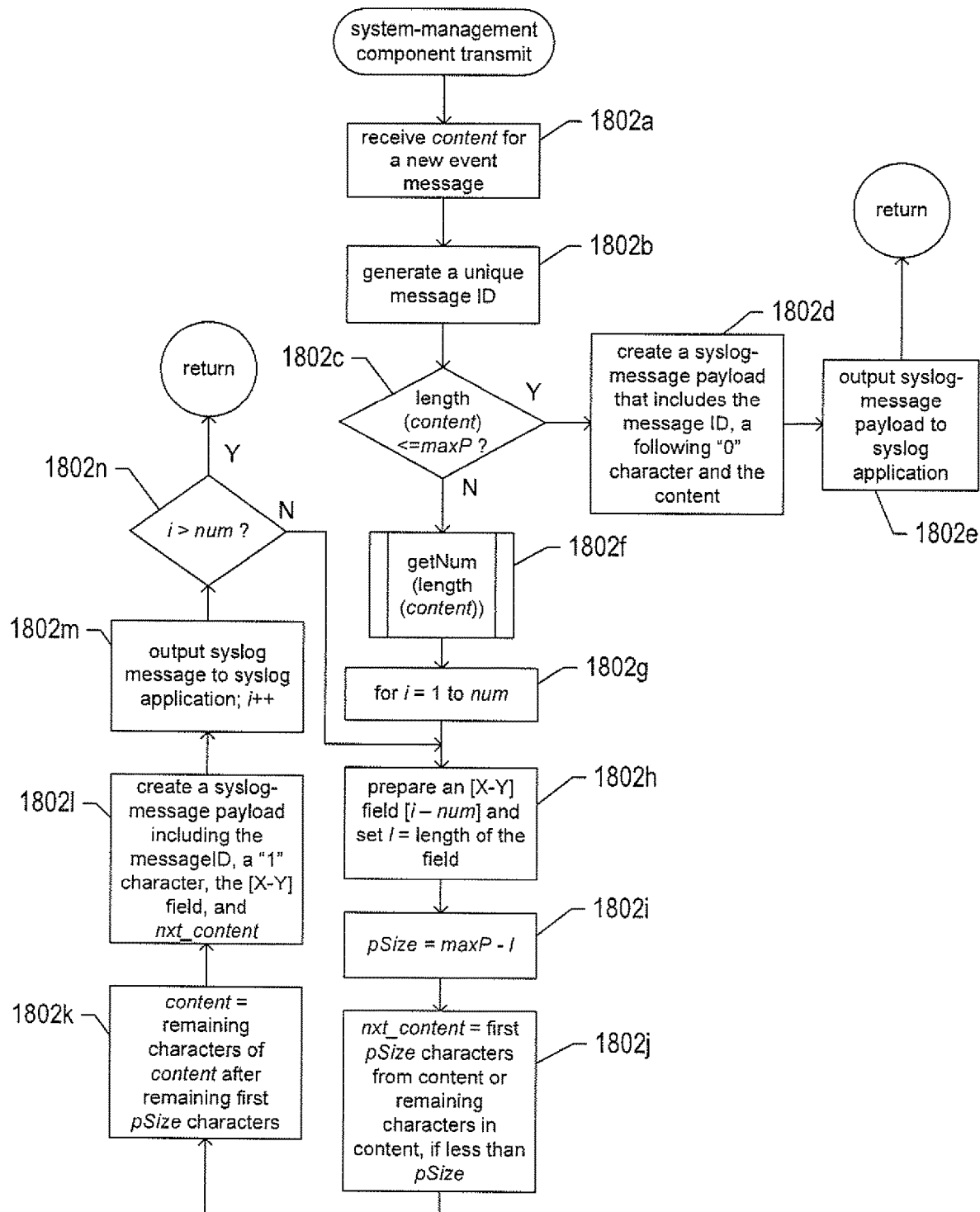
FIGS. 18A-18G illustrate one implementation of the application-level tunnel, disclosed in the current document, in a series of control-flow diagrams and a data-structure diagram.

Next, FIGS. 18A-18G illustrate one implementation of the application-level tunnel, disclosed in the current document, in a series of control-flow diagrams and a data-structure diagram. FIG. 18A provides a control-flow diagram for a system-management-component-transmit routine. This routine illustrates generation and transmission of syslog messages that contain event messages and event-message portions by the system-management-component layer (1410 in FIG. 14) and the content-generation layer (1411 in FIG. 14) of the distributed-computer-system component (1402 in FIG. 14). In step 1802*a*, the system-management-component-transmit routine receives content for a new event message. In step 1802*b*, the system-management-component-transmit routine generates a unique message identifier for the new event message. When the length of the event-message content is less than or equal to the maximum available payload, maxP, as determined in step 1802*c*, the received content is prepared for packaging into a single syslog message (1616 in FIG. 16) by appending the message identifier and a long-message-indication field with a value "0" to the content, in step 1802*d*. Then, in step 1802*e*, the content is output to the syslog-application layer (1412 in FIG. 14) for transmission to one or more syslog servers. When the length of the received content is greater than the maximum available payload, maxP, as determined in step 1802*c*, the system-management-component-transmit routine calls a routine "getNum," in step 1802*f*, to determine the number of long-event-message portions to send in order to transmit the long event message through the application-level tunnel. In the for-loop of steps 1802*g*-1802*n*, the system-management-component-transmit routine prepares each portion of the content for packaging into a syslog message for transmission to one or more syslog servers. In step 1802*h*, an [X–Y] field for the next content portion is prepared and the local variable l is set to the length of the [X-Y] field. In step 1802*i*, the length of the content portion, pSize, is computed as maxP minus l. In step 1802*j*, a next block of characters, nxt_content, is extracted from the remaining content for packaging. The next block of characters is of length pSize for all but the final content portion, which can have a length of from 1 to pSize. In step 1802*k*, the remaining content is set to those characters, if any, remaining after extraction of the next block of characters in step 1802*j*. In step 1802*l*, a syslog-and message payload including the message identifier, a long-message-indication field with the value "1," and the [X-Y] field prepared in step 1802*h*, is generated and, in step 1802*m*, is output to the syslog-application layer.

Figure 18B:
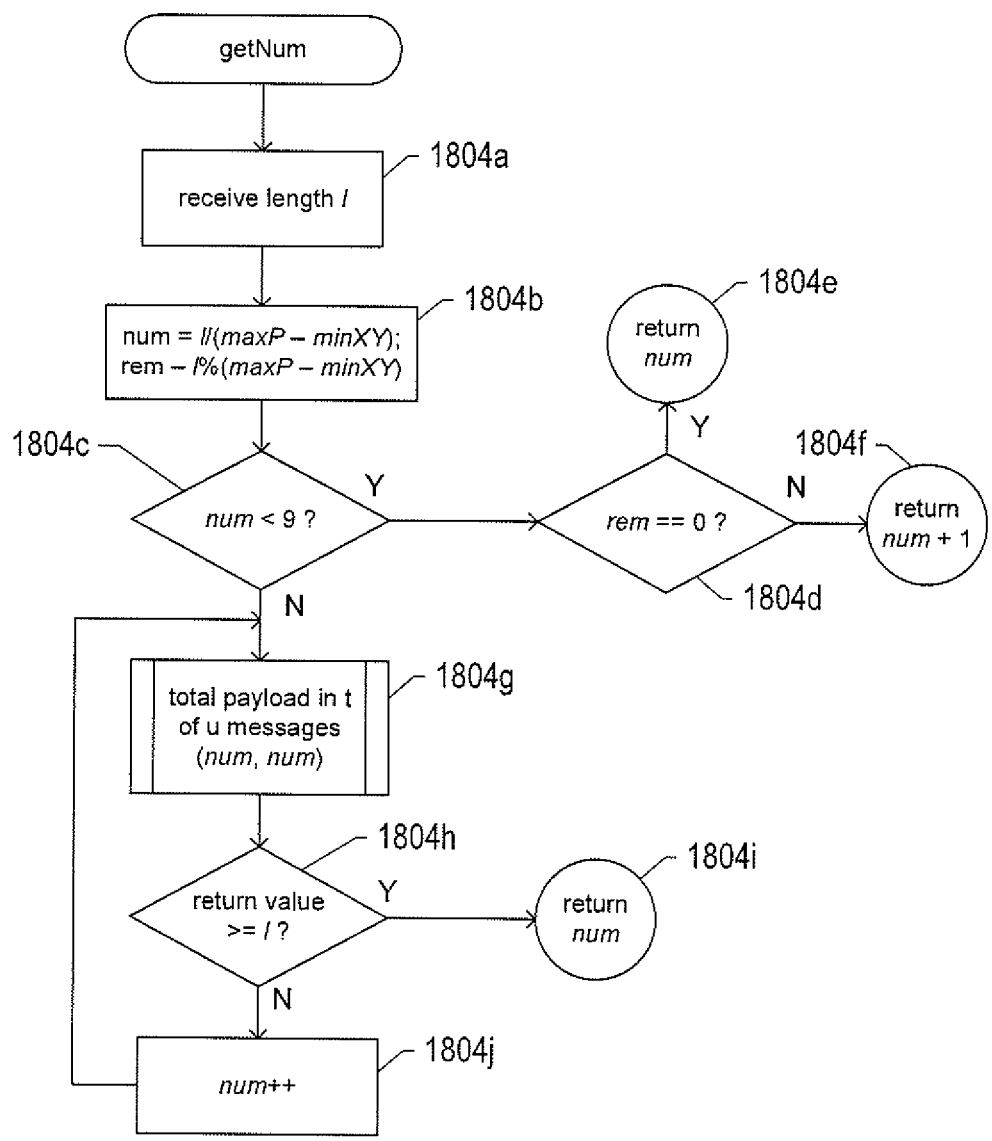

FIG. 18B provides a control-flow diagram for the routine "getNum," called in step 1802*f* of FIG. 18A. This routine determines the number of long-event-message portions that need to be sent in order to send the corresponding long event message through the application-level tunnel. In step 1804*a*, the length of the content of the long event message, l, is received. In step 1804*b*, the number, num, of long-event-message portions is approximated by integer division of l by the difference of maxP and the minimum [X-Y]-field length, minXY. The remainder following the integer division, rem, is also computed. The approximate number num is less than or equal to the actual number of long-event-message portions needed, since it is based on a minimum-length [X-Y] field. When num is less than 9, as determined in step 1804*c*, then when rem is equal to 0, as determined in step 1804*d*, the value of local variable num is returned, in step 1804*e*. Otherwise, num+1 is returned, in step 1804*f*. When num is greater than or equal to 9, as determined in in step 1804*c*, the routine "total payload in t of u messages" is called to determine the number of payload characters that can be accommodated in num long-event-message portions. When the computed total payload is greater than or equal to the length of the content l, as determined in step 1804*h*, num is returned in step 1804*i*. Otherwise, in step 1804*j*, num is incremented and control flows back to step 1804*g*. The loop of steps 1804*g*-1804*j* continues until the number of long-event-message portions, num, is sufficient to accommodate content of length l.

Figure 18C:
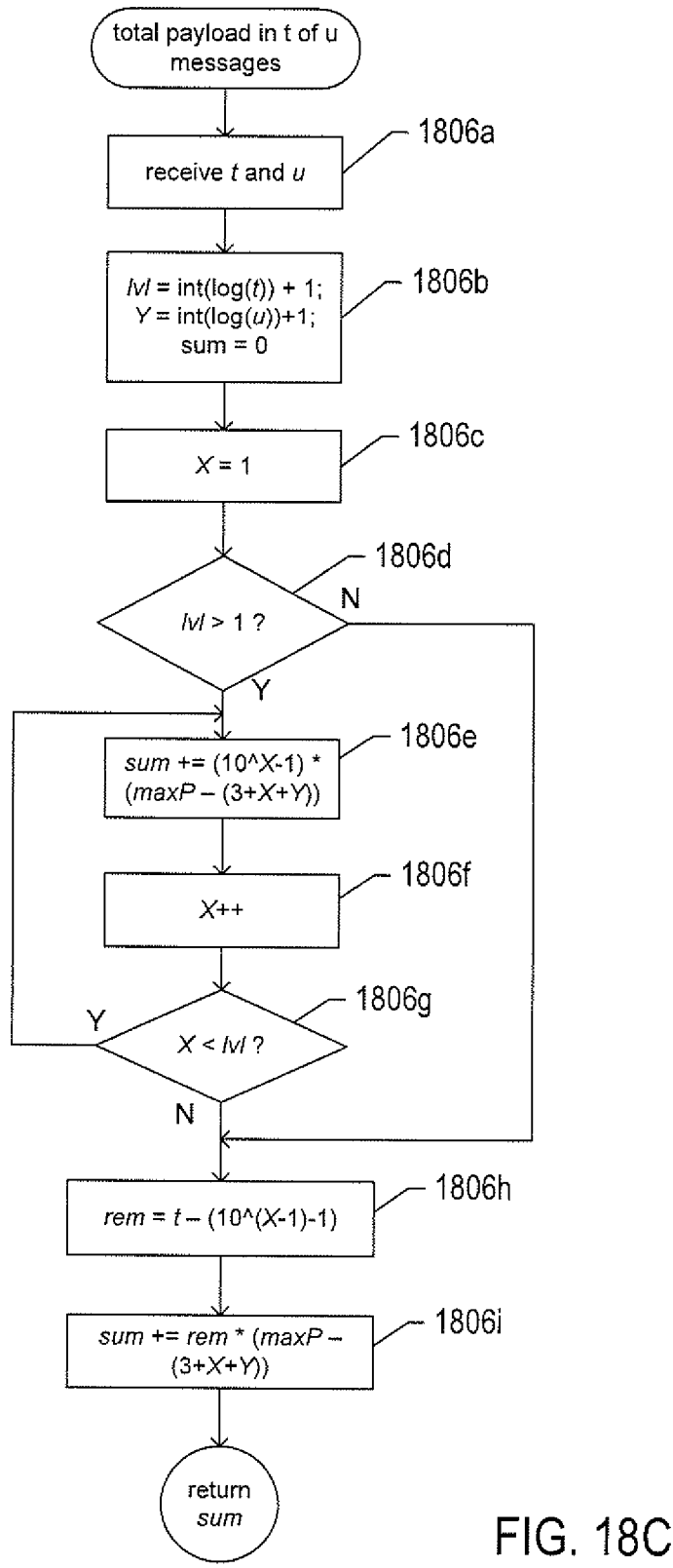

FIG. 18C provides a control-flow diagram for the routine "total payload in t of u messages," called in step 1804*g* of FIG. 18*b*. In step 1806*a*, the routine "total payload in t of u messages" receives a number of long-event-message portions t and a total number of long-event-message portions u. In step 1806*b*, the routine "total payload in t of u messages" initializes three local variables: (1) lvl, assigned to the integer portion of the logarithm, to base 10, of the number of messages t; (2) Y, assigned to the integer portion of the logarithm, to base 10, of the total number of messages u; and (3) sum, assigned to the value 0. In step 1806*s*, local variable X is set to 1. When the value in local variable lvl is less than or equal to 1, as determined in step 1806*d*, control flows to step 1806*h*. Otherwise, in the loop of steps 1806*e*-1806*g*, the local variables sum and X are iteratively incremented until the value of X is equal to the value of local variable lvl, as determined in step 1806*g*. In step 1806*d*, the local variable sum is incremented by 10 raised to the power X−1 times the payload available for long-event-message portions in which the number of digits in the [X-Y] field is equal to maxP minus (3+X+Y). When the loop of steps 1806*e*-1806*g* completes, the remaining number of messages not yet considered, rem, is computed to be the number of messages t minus 1+10 raised to the power X−1. Finally, in step 1806*i*, local variable sum is incremented by the value rem times the value max? minus (3+X+Y). The value stored in sum is the total amount of payload contained in the first t long-event-message portions of a total of u long-event-message portions. This computation is based on the variable size of the [X-Y] field, discussed above with reference to FIG. 17.

Each of the long-event-message portions is separately transmitted by the syslog-application layer to one or more syslog servers. These messages are accumulated by the one or more syslog servers and are provided, upon request, to the system-management-application layer (1434 in FIG. 14). The system-management-application layer extracts the payloads from multiple syslog messages containing long-event-message-portions and recombines them into a single syslog message containing a long event message. Because the underlying communications protocols and media do not necessarily guarantee delivery of syslog messages and do not guarantee sequential delivery of syslog messages, numerous data structures are maintained by the system-management-application layer within the administration computer system (1408 in FIG. 14) in order to reconstruct long event messages.

Figure 18D:
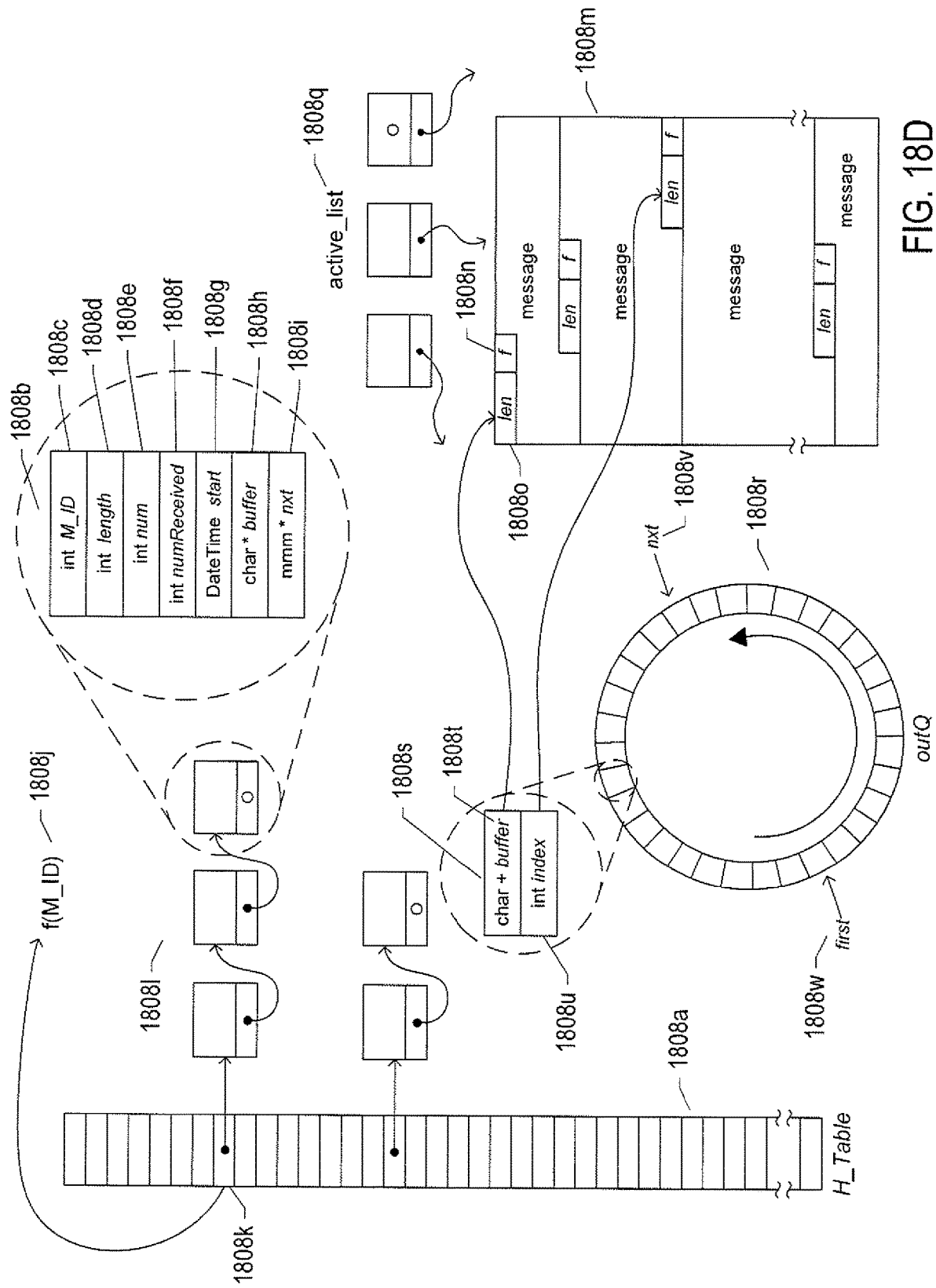

FIG. 18D illustrates the data structures maintained by the system-management-application layer within the administrative computer system in order to receive and process syslog messages obtained through the administration-interface layer (1431 in FIG. 14) from the administration-interface layer (1427 in FIG. 14) of the syslog server. A hash table, H_Table, 1808*a* is used to store mmm records 1808*b* that each describe a long event message that is currently being received by the system-management-application layer. Each mmm record includes the following fields: (1) M_ID 1808*c*, the application-level message identifier for the long event message appended to the host name extracted from the syslog prefix; (2) length 1808*d*, the number of bytes of content so far received; (3) num 1808*e*, the total number of long-event-message portions corresponding to the long event message; (4) numReceived 1808*f*, the number of long-event-message portions so far received; (5) start 1808*g*, the date and time when the first long-event-message portion was received; (6) buffer 1808*h*, a pointer to a buffer that contains the content and header for a single long syslog message reconstituted from multiple long-event-message portions; and (7) nxt 1808*i*, a pointer to a next mmm record, if any, and a list of mmm records that together comprise a hash-table bucket. In order to find the mmm record corresponding to a long event message with application-level message identifier M_ID, a hash function is applied to M_ID 1808*j* to generate an index into the hash table H_Table. The index is used to access an entry 1808*k* within Hash_Table that includes a pointer to a list of one or more mmm records 1808*l*. The list of one or more mmm records is searched for an mmm record with an M_ID field having the value M_ID. The system-management-application layer generally receives sets of multiple syslog messages from the administration-interface layer of the syslog server. In the described implementation, these messages are sequentially stored in a message buffer 1808*m*. Each message, such as message 1808*n*, is preceded by a header that includes a length field, len, 1808*o* and a free field, f, 1808*p*. The length field indicates the number of characters in the message and the free field indicates whether or not the message has been received and processed by higher functionalities within the system-management-application layer. Message buffers are also used to store long event messages reconstituted from long-event-message portions by the system-management-application layer. The buffers are referenced from a list, active_list, 1808*q*, that references buffers that contain at least one message having a free field with the value "0" or FALSE. Messages initially received by the system-management-application layer in message buffers are queued to a circular output queue, outQ 1808*r*. Each entry in the output queue, such as entry 1808*s*, includes a pointer to a message buffer 1808*t* and the index 1808*u* of the header of a message within the buffer. Received messages are queued to the output-queue entry pointed to by the pointer nxt 1808*v*, after which the pointer nxt is incremented. Messages are retrieved from the output queue by accessing the output-queue entry pointed to by the pointer first 1808*w*, after which the pointer first is incremented. The system-management-application layer receives both short and long application-level event messages in message buffers, reconstitutes long event messages, and queues both short and long event messages to the output queue. Higher-level functionalities within the administration server asynchronously retrieve received messages from the output queue for processing. Thus, the system-management-application layer comprises a low-level application-level-tunnel-message-reception layer and one or more higher-level layers that receive and process syslog messages containing long event messages.

Figure 18E:
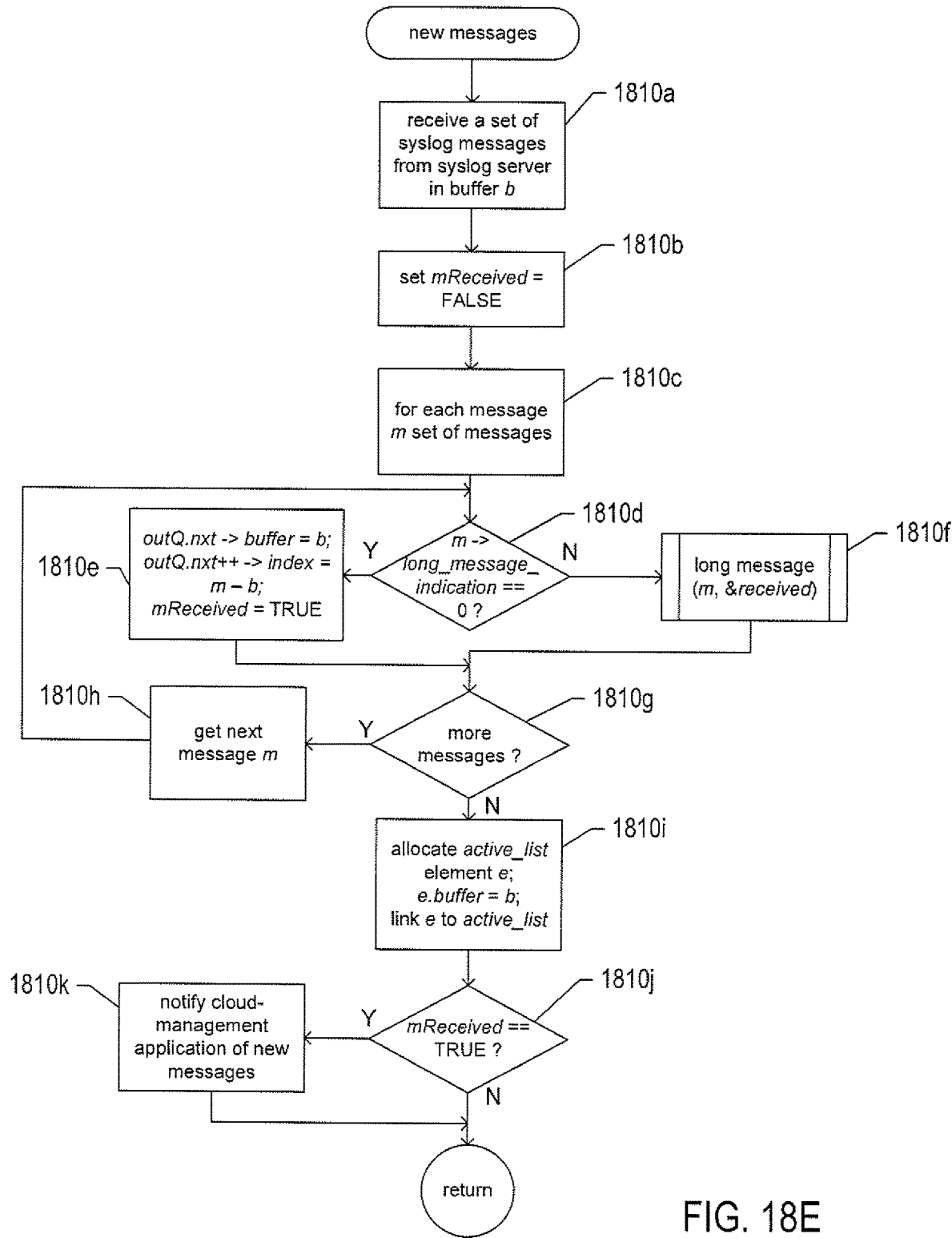

FIG. 18E provides a control-flow diagram for a routine "new messages" that runs in the administration-management-application layer (1432 in FIG. 14) to receive new event messages packaged within syslog messages. In step 1810*a*, the routine "new messages" receives a next set of syslog messages, packaged within a message buffer referenced by message-buffer pointer b (1808*m* in FIG. 18D). In step 1810*b*, the local variable mReceived is set to FALSE. In the for-loop of steps 1810*c*-1810*h*, each message m in the message buffer b is processed. When the long_message_indication field (1631 in FIG. 16) has the value "0," as determined in step 1810*d*, the message m is a single syslog message containing a single event message and is therefore queued to the output queue outQ, in step 1810*e*, with the output-queue entry set to point to the buffer b and to the index within the buffer corresponding to the len field preceding message m. In addition, the local variable mReceived is set to TRUE. Otherwise, when the long_message_indication field in the currently considered message is equal to "1," as determined in step 1810*d*, the routine "long message" is called, in step 1810*f*. When there are more messages within the buffer b, as determined in step 1810*g*, the pointer m is set to the next message in buffer b, in step 1810*h*, and the for-loop of steps 1810*c*-1810*h* processes the next message in a next iteration. When the for-loop of steps 1810*c*-1810*h* terminates, the message buffer b is added to the data structure active_list (1808*q* in FIG. 18D), in step 1810*i*. The buffer is maintained in the data structure active_list until all the messages in the buffer are processed by higher-level functionality in the system-management-application layer. When the higher-level functionality receives and processes a message, the f field in the message header (1808*p* in FIG. 18D) is set to TRUE or "1." When the value of the local variable mReceived is TRUE, as determined in step 1810*j*, the higher-level functionality within the system-management-application layer is notified of the receipt of new messages, in step 1810*k*.

Figure 18F:
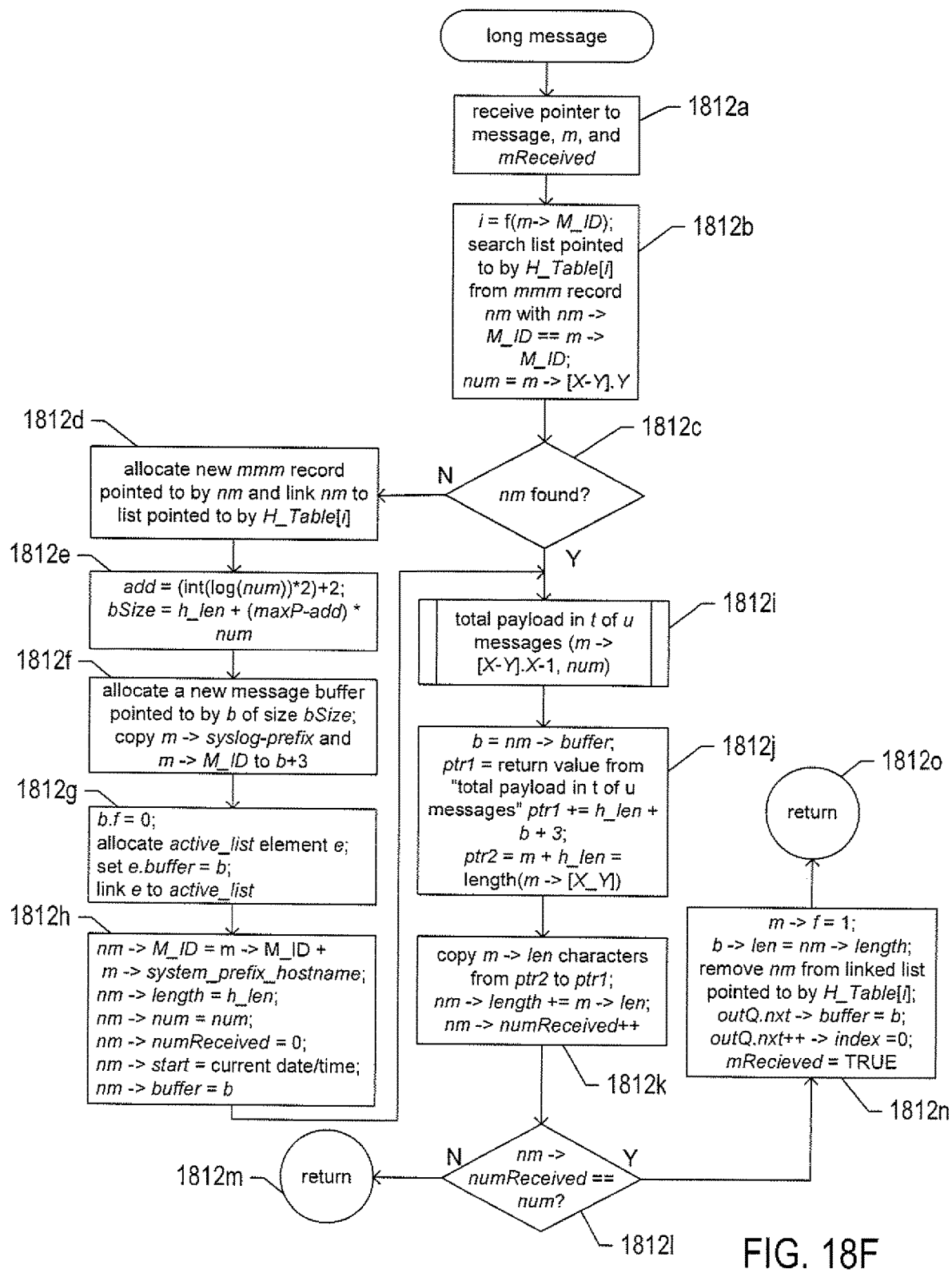

FIG. 18F provides a control-flow diagram for the routine "long message," called in step 1810*f* in FIG. 18E. In step 1812*a*, the routine "long message" receives a pointer to a message m and the local variable mReceived, passed by value. In step 1812*b*, the routine "long message" hashes the value in the M_ID field of message m combined with the host name extracted from the syslog-message prefix to obtain an index i for a pointer to a list of mmm records contained in the hash-table entry H_Table[i]. The list of mmm records is searched for an mmm record having an M_ID field with a value equal to the contents of the M_ID field within the message m combined with the host name extracted from the syslog-message prefix. The local variable num is set to the total number of long-event-message portions indicated by the value Y in the [X–Y] field of the message m. When an mmm record is not found in the list with the appropriate M_ID-field value, as determined in step 1812*c*, the currently considered message is the first long-event-message portion received for a long event message. Therefore, in steps 1812*d*-1812*h*, a new mmm record is allocated and added to the list of mmm records pointed to by hash-table entry H_Table[i] and a new message buffer is allocated to hold the long event message. In step 1812*d*, a new mmm record, nm, is allocated and linked to the list pointed to by the hash-table entry H_Table[i]. In step 1812*e*, the size, bSize, for a new message buffer is computed. In step 1812*f*, a new memory buffer b of size bSize is allocated and the syslog-prefix and message-identifier fields are copied from message m into the buffer, following the three-character header that includes the fields len (1808*o* in FIG. 18D) and f (1808*p* in FIG. 18D). The field f is set to the value "0." In step 1812*g*, an entry is allocated and added to the data structure active_list to reference the newly allocated buffer b. In step 1812*h*, the fields in the mmm record nm are initialized. Control then flows to step 1812*i* to resume processing of message m. In step 1812*i*, the routine "total payload in t of u messages," previously discussed with reference to FIG. 18C, is called to compute the index of the first character of the content payload in message m with respect to the entire long event message. In step 1812*j*, the pointer ptr1 is set to point to the position in the message buffer b into which to copy the payload of the message m and the pointer ptr2 is set to point to the first character in the message m to copy. In step 1812*k*, the payload of the message m is copied into memory buffer b and the value in the length field of the mmm record nm is updated by adding the length of the payload copied to the buffer to the previous value of the length field. The value in the field numReceived of the mmm record nm is incremented. When the value in the mmm record nm numReceived field is equal to num, as determined in step 1812*l*, the routine "long message" returns, in step 1812*m*. Otherwise, when the value in the nm field numReceived is equal to num, m is the final long-event-message portion for the long event message. In that case, in step 1812*n*, the field f of message m is set to "1," or TRUE, the len field in the buffer b is set to the value in the nm length field, the mmm record nm is removed from the linked list pointed to by H_Table [i], the new buffer b is queued to the output queue outQ, and the local variable mReceived is set to TRUE.

Figure 18G:
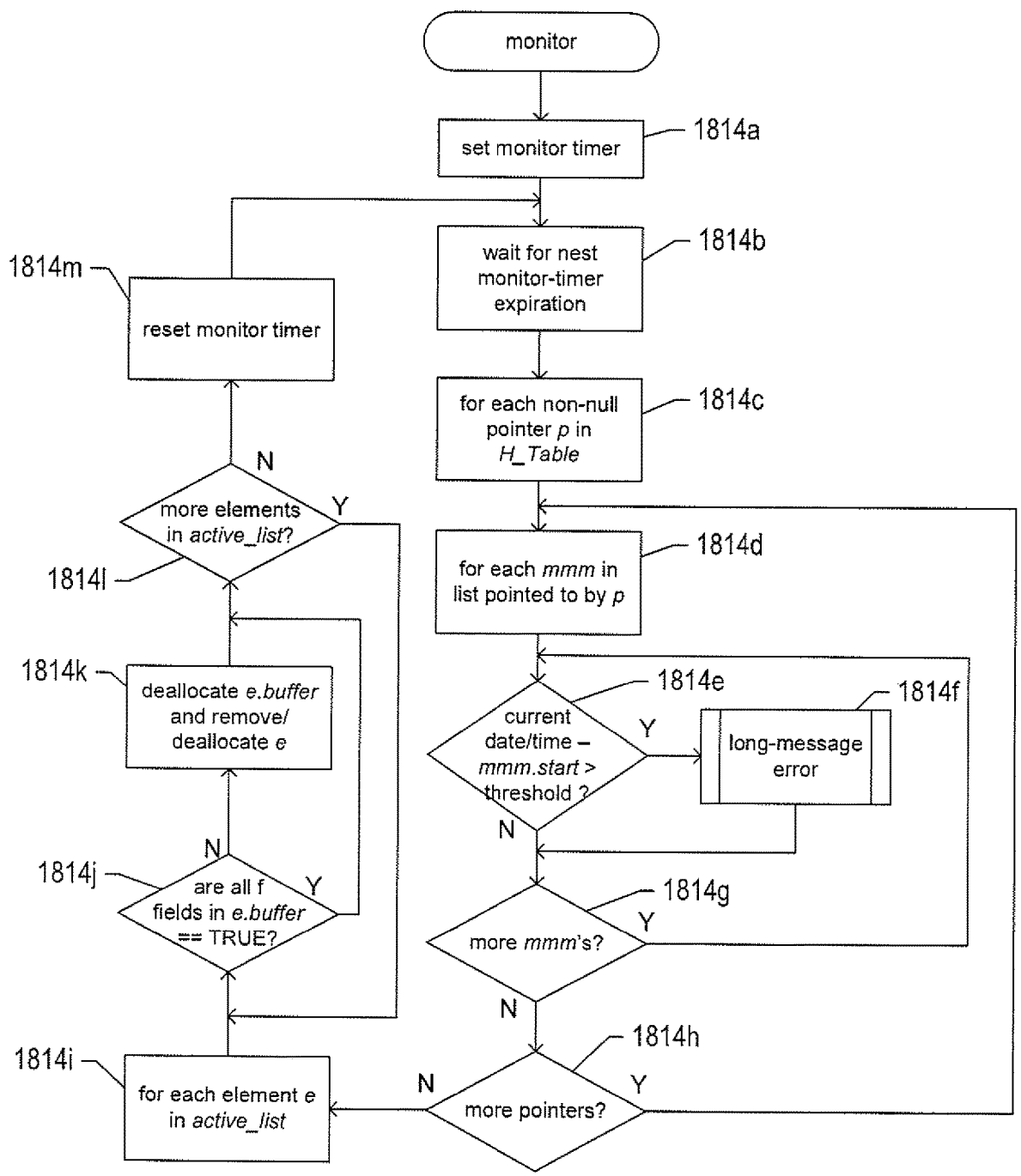

FIG. 18G provides a control-flow diagram for a routine "monitor" that is periodically executed by the system-management-application layer of the administration computer system to remove unused buffers from the active_list data structure and detect long event messages that have failed to be completely received. In step 1814*a*, the routine "monitor" sets a monitor timer to expire at a future point in time. Then, in the continuous loop of steps 1814*b*-1814*m*, the routine "monitor" waits for a next monitor-timer expiration, in step 1814*b*, and then carries out several monitoring tasks before again resetting of the monitor timer, in step 1814*m* and again waiting for the next monitor-timer expiration in step 1814*b*. In the outer for-loop of steps 1814*e*-1814*h*, the routine "monitor" considers each non-null pointer p in the hash-table H_Table. In the inner for-loop of steps 1814*d*-1814*g*, the routine "monitor" considers each mmm record in the list pointed to by p. When the difference between current system date/time value and the data/time value of the start field in the currently considered mmm record is greater than a threshold value, as determined in step 1814*e*, a long-event-message error handler is called, in step 1814*f*, to handle an incomplete-long-event-message error. As discussed above, the syslog protocol does not, in general, provide guaranteed delivery of syslog messages. Therefore, it is possible that one or more long-event-message portions of a long event message may fail to be received, as a result of which the long event message will never be completely received. Various different methods may be used to ameliorate such failures. In one approach, the mmm record and message buffer associated with the long event message are deleted, since long event messages may fail to be received just as short event messages packaged in single syslog messages may fail to be received. In another approach, the portion of the long-event-message content successfully transmitted may be passed to higher-level functionalities within the system-management-application layer of the administration computer along with an indication that not all of the content of the long event message was successfully received. In the for-loop of steps 1814*i*-1814*l*, each element in the active_list data structure is accessed in order to determine whether or not the message buffer pointed to by the element can be deallocated and the element removed from the active_list data structure. Memory buffers are deallocated when all of the f fields in the memory buffer have the value "1," or TRUE.

Figure 19:
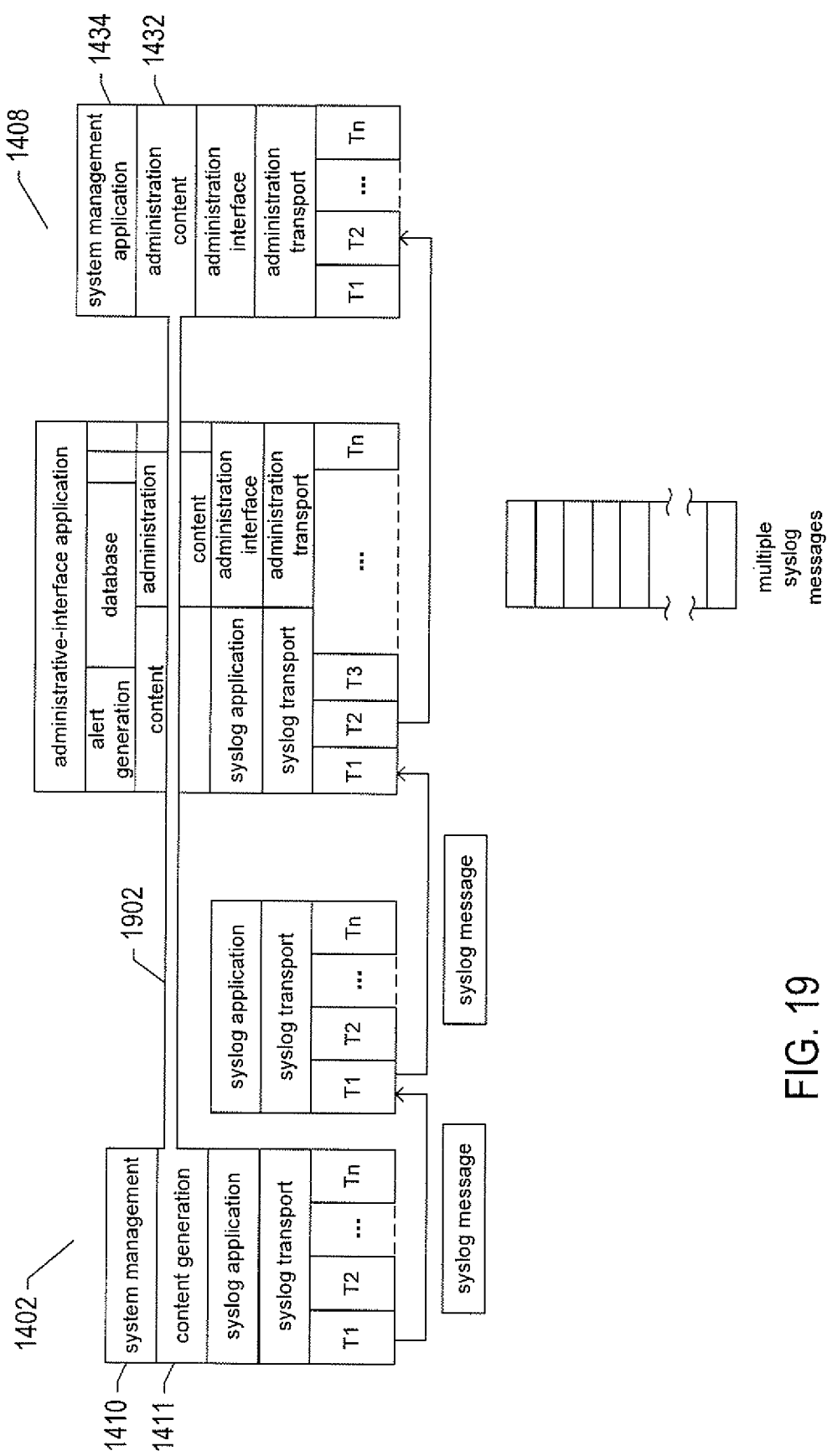
FIG. 19 uses the same illustration conventions used for FIG. 14 to illustrate the application tunnel disclosed in the current document.

FIG. 19 uses the same illustration conventions used for FIG. 14 to illustrate the application tunnel disclosed in the current document. Logically, the application tunnel 1902 connects the content-generation layer 1411 and system-management layer 1410 of the distributed-computer-system component 1402 with the administration-content layer 1432 and system-management-application layer 1434 of the administration computer system 1408. The application-level tunnel 1902 is, in the described implementation, implemented using the above-described functionalities for accommodating long syslog messages as well as the underlying syslog-messaging functionalities. By "tunnel," the phrase "application-level tunnel" refers to the fact that the underlying syslog-messaging functionalities are unaware of the modifications that support long syslog messages and are not modified to support long syslog messages. Long syslog messages are, instead, an application-level concept and are implemented and supported at the application level.

Although the present invention has been described in terms of particular embodiments, is not intended that the invention be limited to these embodiments. Modification within the spirit of the invention will be apparent to those skilled in the art. For example, any of many different alternative implementations can be obtained by varying any of many different design and implementation parameters, including choice of hardware components and configurations of distributed computer systems, choice of programming languages, operating systems, virtualization layers, control structures, data structures, modular organization, and other such design and implementation parameters. The currently disclosed implementations use specific data structures and interfaces for implementing the application-level functionality that supports long syslog messages, but, in alternative implementations, application-level tunnels can be implemented using different data structures and different interfaces at the application level. The current implementation employs an application-level message-identifier field, a long-message-indication field, and an [X–Y] field for long event messages transmitted in multiple syslog messages. In alternative implementations, different fields containing different information may be alternatively employed. For example, when the characters used in the delimiters for the [X–Y] field can be distinguished from event-message content, the long_message_field may be omitted. Application-level tunnels may be implemented to connect application-level functionality of many different types of communicating systems in addition to system-management applications.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. An event-message generation and transmission subsystem within a distributed computer system, the event-message generation and transmission subsystem comprising:
   one or more processors;
   one or more memories;
   a communications subsystem; and
   computer instructions, stored in one or more of the one or more memories that, when executed by one or more of the one or more processors, control the event-message generation and transmission subsystem to
      generate, by application-level functionality within distributed-computer-system components, a long event message that, were the long event message packaged in a single syslog message, would form a syslog message with a length that exceeds a specified syslog supported message length,
      package, by the application-level functionality within the distributed-computer-system components, the long event message into two or more component syslog messages,
      transmit the component syslog messages from the application-level functionality within distributed-computer-system components to an administration computer system through the syslog-messaging subsystem,
      receive the component syslog messages by application-level functionality within the administration computer system, and
      generate the long event message from the received component syslog messages by the application-level functionality within the administration computer system.

2. The event-message generation and transmission subsystem of claim 1 wherein the application-level functionality within a distributed-computer-system component generates a unique message identifier for each event message generated and transmitted by the distributed-computer-system component.

3. The event-message generation and transmission subsystem of claim 1
   wherein the application-level functionality within the distributed-computer-system components packages a short event message into a single syslog message with a length that is less than or equal to a specified syslog supported message length; and wherein the application-level functionality within the distributed-computer-system components packages a long event message that, were the long event message packaged in a single syslog message, would form a syslog message with a length that exceeds a specified syslog supported message length, into two or more component syslog messages.

4. The event-message generation and transmission subsystem of claim 3 wherein a single syslog message packaging a short event message comprises:
a syslog-message prefix;
an application-level message identifier;
and the short event message.

5. The event-message generation and transmission subsystem of claim 4 wherein the single syslog message packaging a short event message further comprises:
a long-event-message-indication field that indicates that the single syslog message contains an entire event message.

6. The event-message generation and transmission subsystem of claim 3 wherein a component syslog message containing a portion of a long event message comprises:
a syslog-message prefix;
an application-level message identifier;
an [X–Y] field; and
the portion of the long event message.

7. The event-message generation and transmission subsystem of claim 6 wherein the component syslog message containing a portion of a long event message further comprises:
a long-event-message-indication field that indicates that the component syslog message contains a portion of an event message.

8. The event-message generation and transmission subsystem of claim 6 wherein the [X–Y] field in a component syslog message containing a portion of a long event message includes:
a value X that represents a sequence number for the portion of the long event message event-message; and
a value Y that represents a total number of event-message portions transmitted in Y syslog messages that together contain the entire long event message.

9. The event-message generation and transmission subsystem of claim 1 wherein the application-level functionality within the administration computer system unpackages a portion of a long event message from a received component syslog message by:
storing the portion of the long event message contained in the component syslog message for subsequent forwarding to the higher-level functionality at the application level.

10. The event-message generation and transmission subsystem of claim 9 wherein, when the received component syslog message is the first component syslog message for the long event message, the application-level functionality within the administration computer system stores the portion of the long event message by:
allocating a buffer for the long event message;
associating the buffer with a combination of the contents of an application-level message identifier contained in the component syslog message and a hostname contained in a syslog-prefix field within the component syslog message;
adding the syslog-prefix field of the received component syslog message to the buffer; and
storing the portion of the long event message at an offset within the buffer determined by a sequence number X contained in an [X–Y] field within the syslog message.

11. The event-message generation and transmission subsystem of claim 9 wherein, when the received component syslog message is not the first component syslog message received that contains a portion of the long event message, the application-level functionality within the administration computer system stores the portion of the long event message by:
identifying a buffer for the long event message using a combination of the contents of an application-level message identifier contained in the component syslog message and a hostname contained in a syslog-prefix field within the component syslog message; and
storing the portion of the long event message at an offset within the buffer determined by a sequence number X contained in an [X–Y] field within the component syslog message.

12. The event-message generation and transmission subsystem of claim 9 wherein, when the received component syslog message is the last component syslog message received that contains a portion of the long event message, the application-level functionality within the administration computer system forwards the syslog message contained in the buffer to higher-level functionality at the application level and deallocates the buffer.

13. A method for transmitting long event messages from a first application-level entity to a second application-level entity within a distributed computer system, the method comprising:
generating, by application-level functionality within the first entity, a long event message that, were the long event message packaged in a single syslog message, would form a syslog message with a length that exceeds a specified syslog supported message length,
packaging, by the application-level functionality within the first entity, the long event message into two or more component syslog messages,
transmitting the component syslog messages from the first entity to the second entity through a syslog-messaging subsystem,
receiving the component syslog messages by the second entity, and
unpackaging the long event message from the received component syslog messages by the second entity.

14. The method of claim 1 wherein first entity generates a unique message identifier for each event message generated and transmitted by the distributed-computer-system component.

15. The method of claim 1
wherein the application-level functionality within the distributed-computer-system components packages a short event message into a single syslog message with a length that is less than or equal to a specified syslog supported message length; and
wherein the application-level functionality within the distributed-computer-system components packages a long event message that, were the long event message packaged in a single syslog message, would form a syslog message with a length that exceeds a specified syslog supported message length, into two or more component syslog messages.

16. The method of claim 3 wherein a single syslog message packaging a short event message comprises:
a syslog-message prefix;
an application-level message identifier;

the short event message; and
a long-event-message-indication field that indicates that the single syslog message contains an entire event message.

17. The method of claim 3 wherein a component syslog message containing a portion of a long event message comprises:
a syslog-message prefix;
an application-level message identifier;
an [X–Y] field;
the portion of the long event message; and
a long-event-message-indication field that indicates that the syslog message contains a portion of an event message.

18. The method of claim 17 wherein the [X–Y] field in a component syslog message containing a portion of a long event message includes:
a value X that represents a sequence number for the portion of the long event message event-message; and
a value Y that represents a total number of event-message portions transmitted in Y syslog messages that together contain the entire long event message.

19. The method of claim 1 wherein the second entity unpackages a portion of a long event message from a received component syslog message by:
storing the portion of the long event message contained in the received component syslog message for subsequent forwarding to the higher-level functionality at the application level.

20. Computer instructions encoded in a physical data-storage device that, when executed by one or more processors of a distributed computer system having one or more processors, one or more memories, and a syslog-messaging subsystem, control the distribution computer system to:
generate, by application-level functionality within distributed-computer-system components, a long event message that, were the long event message packaged in a single syslog message, would form a syslog message with a length that exceeds a specified syslog supported message length,
package, by the application-level functionality within the distributed-computer-system components, the long event message into two or more component syslog messages,
transmit the component syslog messages from the application-level functionality within distributed-computer-system components to an administration computer system through the syslog-messaging subsystem,
receive the component syslog messages by application-level functionality within the administration computer system, and
generate the long event message from the received component syslog messages by the application-level functionality within the administration computer system.

* * * * *